(12) United States Patent
Lee et al.

(10) Patent No.: US 10,261,631 B2
(45) Date of Patent: Apr. 16, 2019

(54) ELECTRONIC DEVICE

(71) Applicant: LG INNOTEK CO., LTD., Seoul (KR)

(72) Inventors: Sang Young Lee, Seoul (KR); Tae Jin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 142 days.

(21) Appl. No.: 15/309,691

(22) PCT Filed: Apr. 10, 2015

(86) PCT No.: PCT/KR2015/003638
§ 371 (c)(1),
(2) Date: Nov. 8, 2016

(87) PCT Pub. No.: WO2015/170836
PCT Pub. Date: Nov. 12, 2015

(65) Prior Publication Data
US 2017/0147144 A1 May 25, 2017

(30) Foreign Application Priority Data

May 8, 2014 (KR) .......... 10-2014-0055149
May 8, 2014 (KR) .......... 10-2014-0055150
May 14, 2014 (KR) .......... 10-2014-0058079

(51) Int. Cl.
*G06F 3/041* (2006.01)
*G06F 3/044* (2006.01)
*B60K 35/00* (2006.01)

(52) U.S. Cl.
CPC ............ *G06F 3/0418* (2013.01); *G06F 3/044* (2013.01); *B60K 35/00* (2013.01); *B60K 2350/1028* (2013.01); *B60K 2350/1072* (2013.01); *G06F 2203/04101* (2013.01); *G06F 2203/04102* (2013.01); *G06F 2203/04112* (2013.01)

(58) Field of Classification Search
CPC .................. G06F 3/0418; G06F 3/044; G06F 2203/04102; G06F 2203/04101; G06F 2203/04112; B60K 35/00; B60K 2350/1028; B60K 2350/1072
See application file for complete search history.

(56) References Cited

U.S. PATENT DOCUMENTS 8,286,489 B2   10/2012   Yamasaki
2004/0239616 A1*  12/2004  Collins ................. G06F 3/0202
                                                              345/156

(Continued)

FOREIGN PATENT DOCUMENTS

KR   10-2013-0071420 A    6/2013
KR   10-2013-0130531 A   12/2013
(Continued)

*Primary Examiner* — Christopher E Leiby
(74) *Attorney, Agent, or Firm* — Birch, Stewart, Kolasch & Birch, LLP

(57) ABSTRACT

Disclosed is an electronic device including a touch sensing unit, and an input unit provided on the touch sensing unit, and including a cover substrate having an input pattern. The touch sensing unit includes a substrate including an active area having a plurality of unit cells, and a sensing line provided on the active area of the substrate to perform a sensing operation through a time domain measuring scheme.

10 Claims, 12 Drawing Sheets

(56) References Cited

U.S. PATENT DOCUMENTS

| | | | |
|---|---|---|---|
| 2009/0013788 A1* | 1/2009 | Yamasaki | G06F 3/0202 73/627 |
| 2011/0048812 A1 | 3/2011 | Yilmaz | |
| 2011/0128257 A1 | 6/2011 | Kim | |
| 2011/0199333 A1 | 8/2011 | Philipp et al. | |
| 2011/0267287 A1 | 11/2011 | Bartling et al. | |
| 2012/0113014 A1* | 5/2012 | Yilmaz | G06F 3/044 345/173 |
| 2012/0271580 A1* | 10/2012 | Bartling | G06F 3/041 702/65 |

FOREIGN PATENT DOCUMENTS

| | | |
|---|---|---|
| KR | 10-2014-0023712 A | 2/2014 |
| KR | 10-2014-0034462 A | 3/2014 |

\* cited by examiner

[Fig. 1]
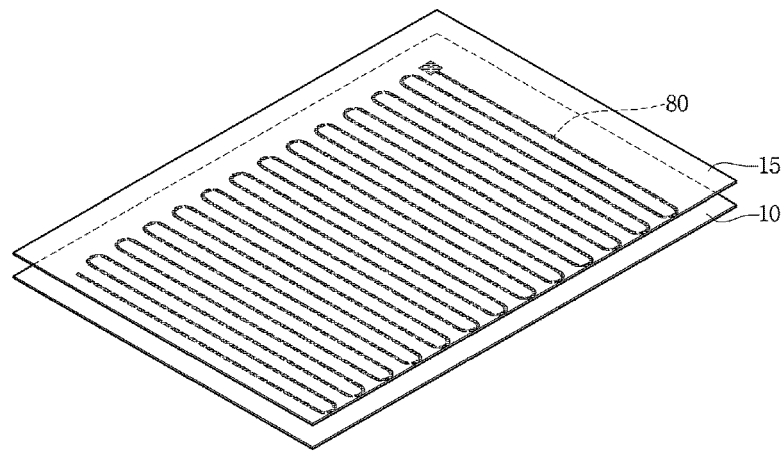
[Fig. 2]
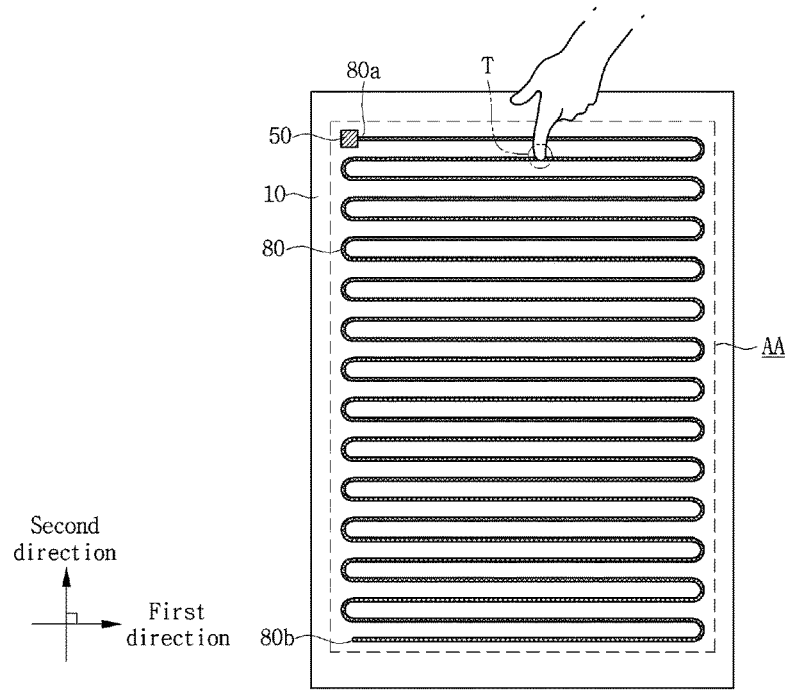
[Fig. 3]
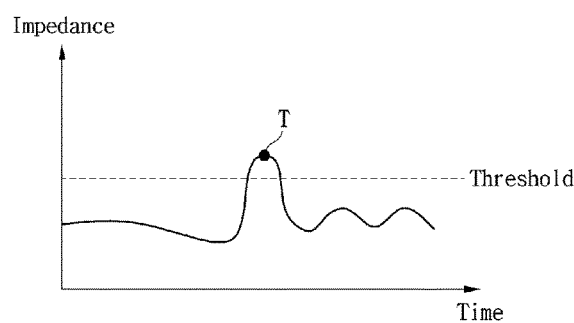

[Fig. 4]
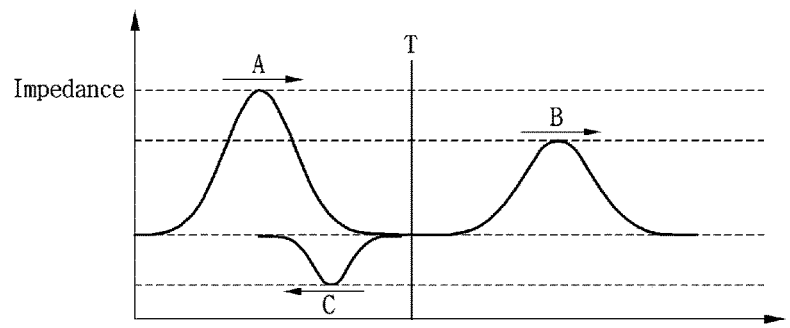
[Fig. 5]
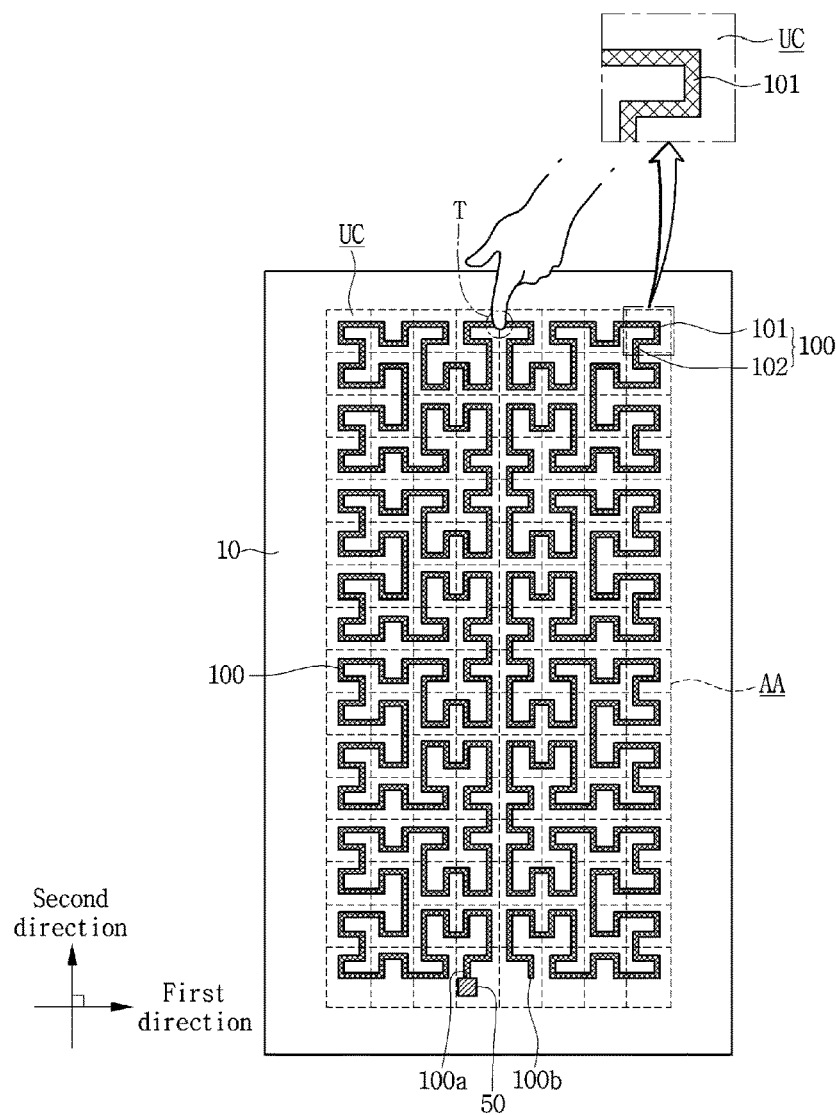

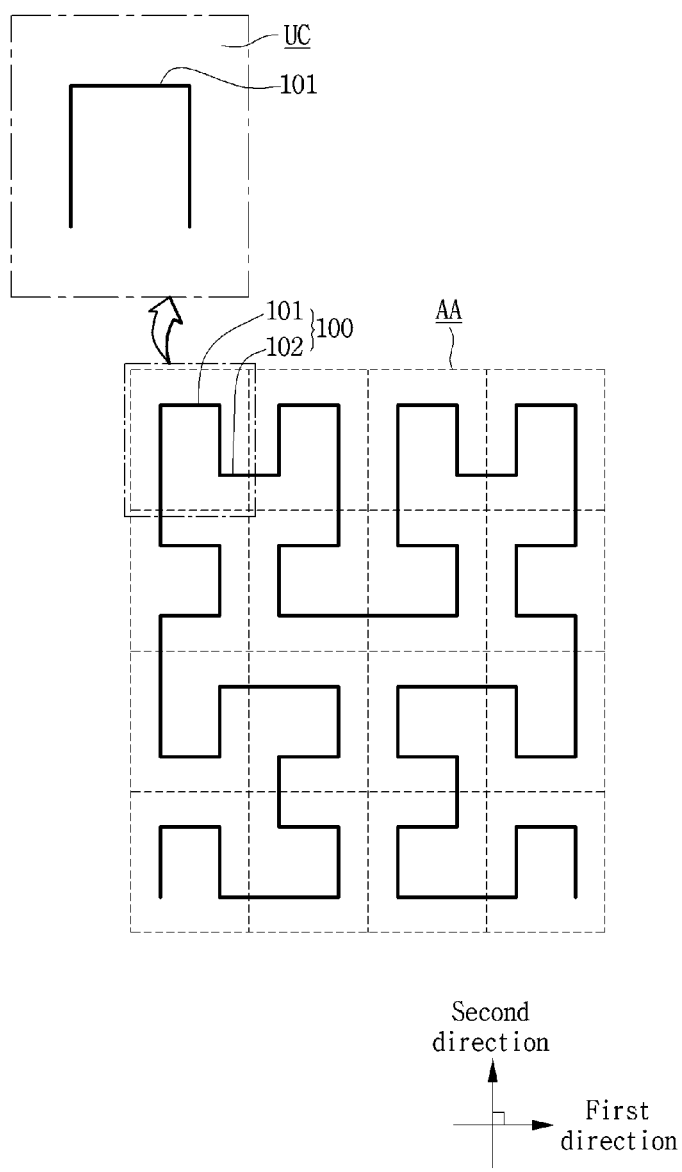

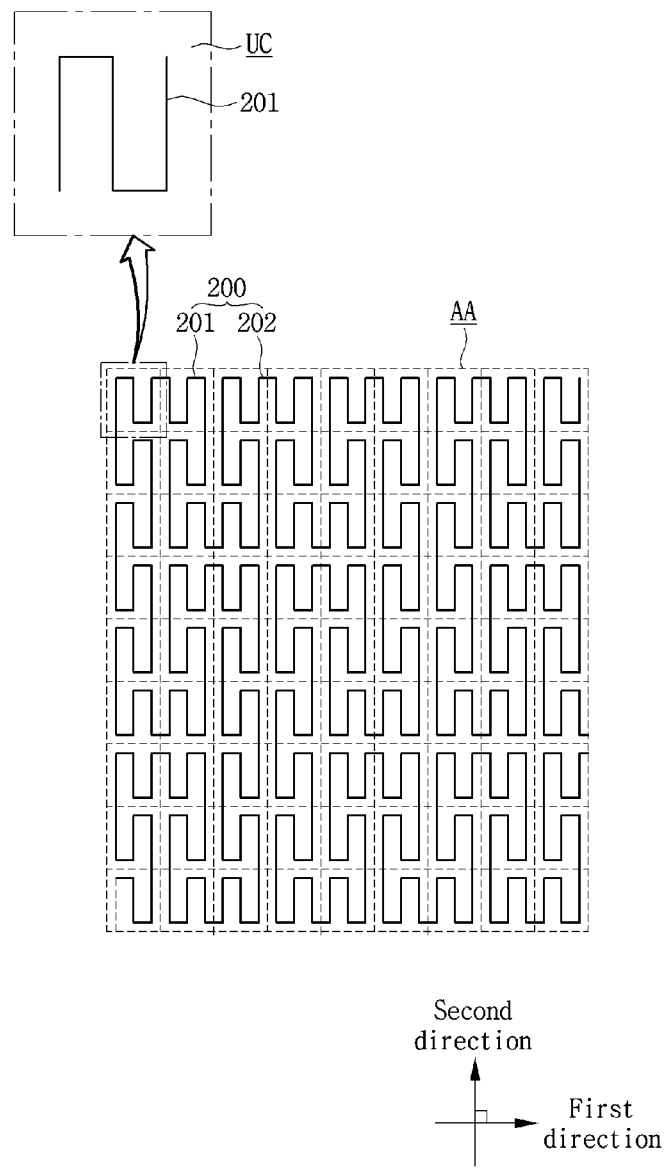

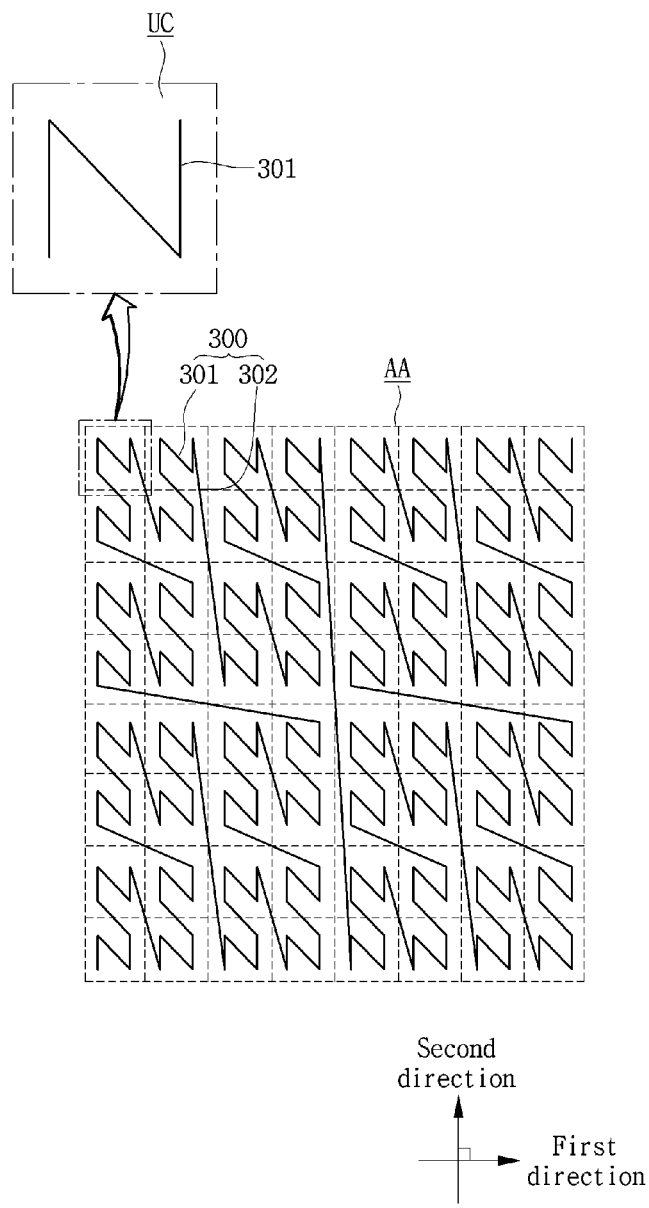

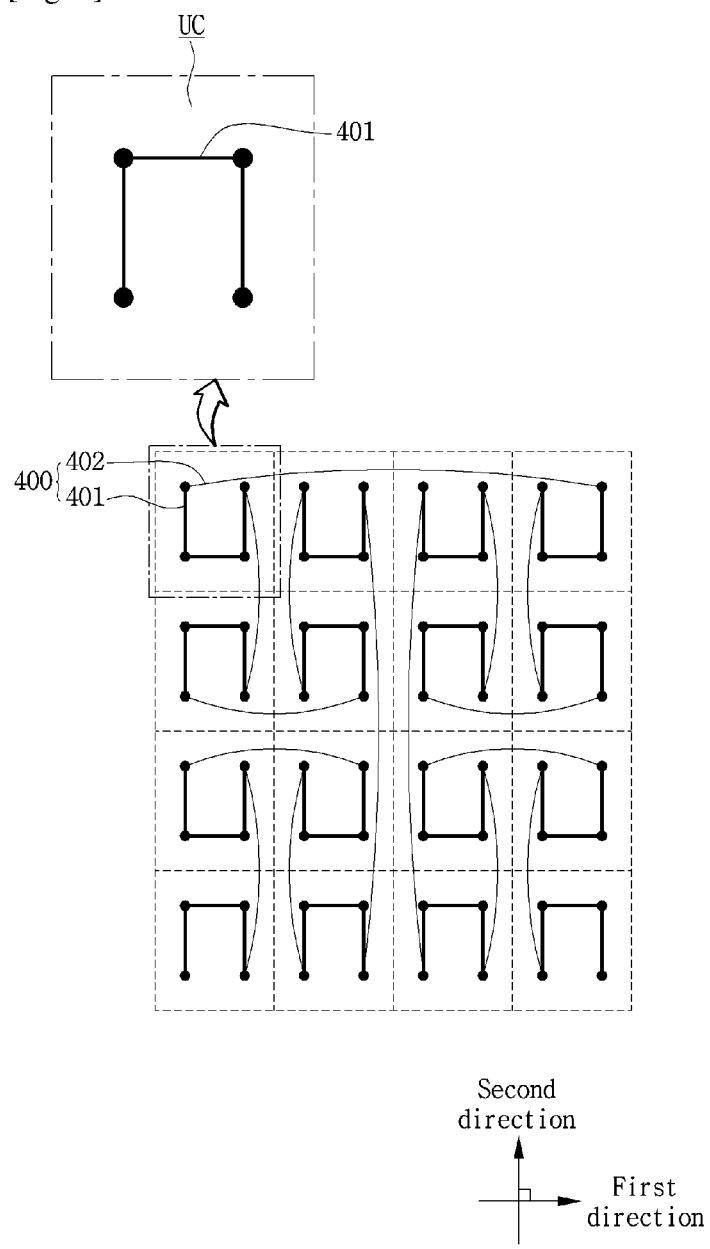

[Fig. 10]
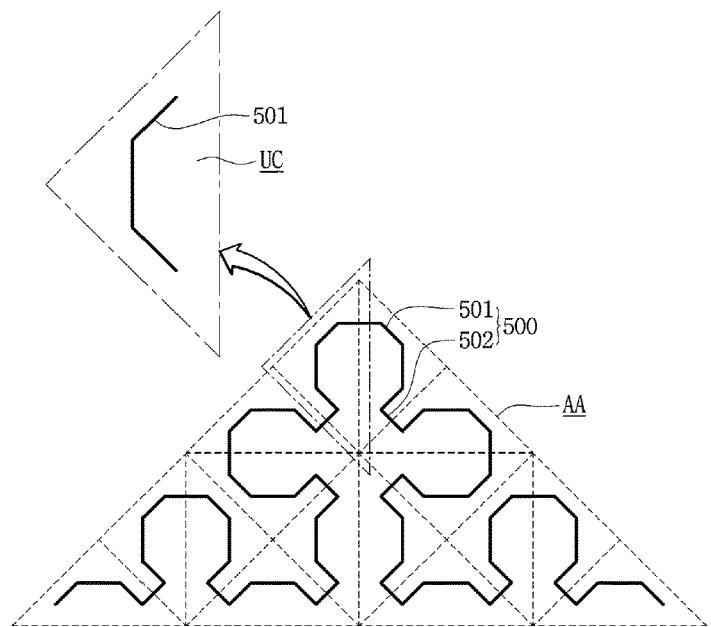
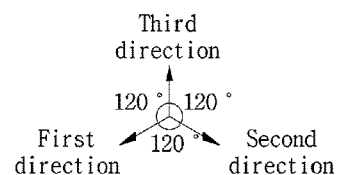
[Fig. 11]
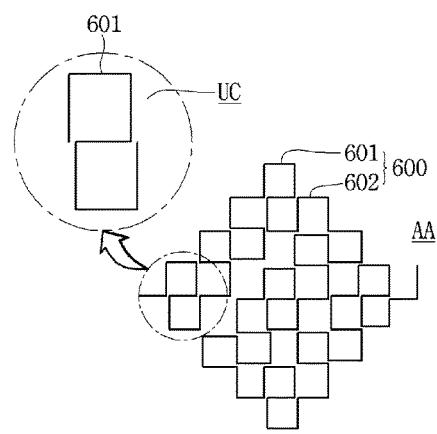
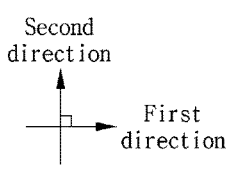

[Fig. 12]
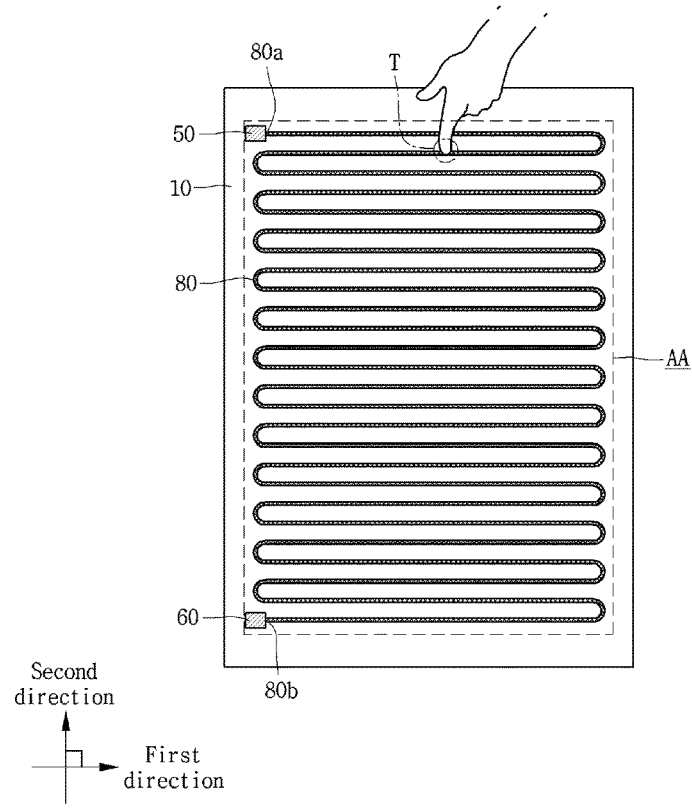
[Fig. 13]
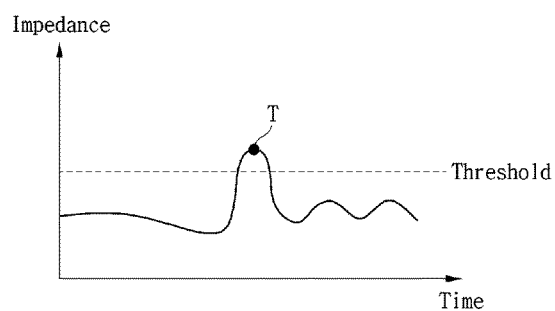
[Fig. 14]
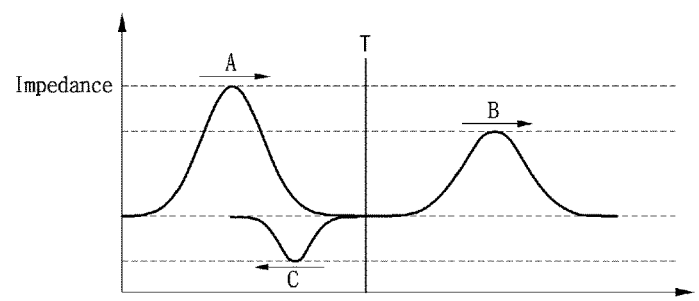

[Fig. 15]
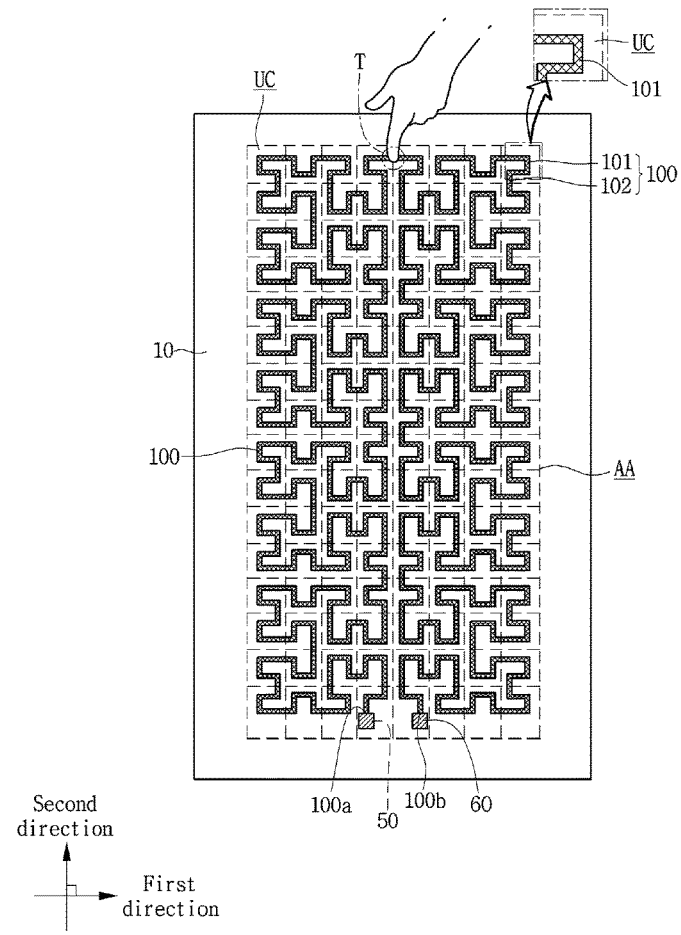
[Fig. 16]
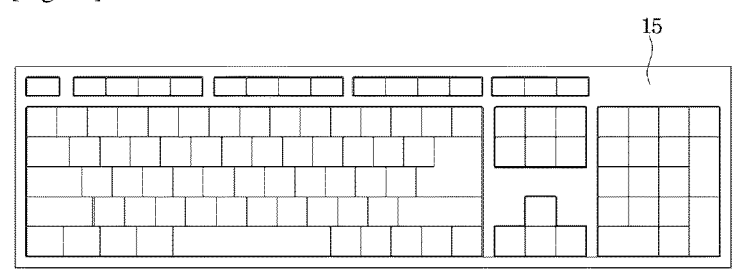
[Fig. 17]
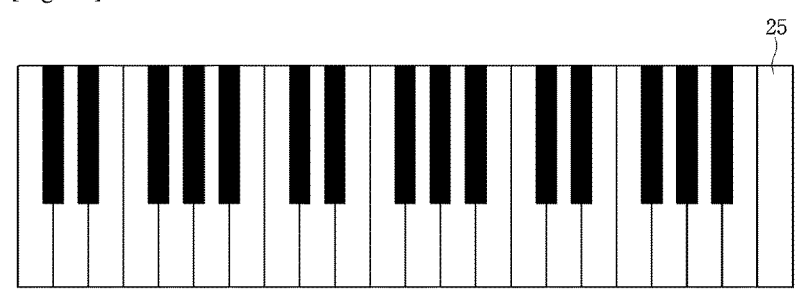

[Fig. 18]
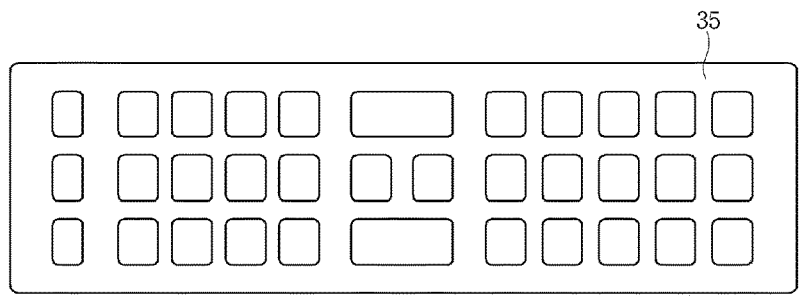
[Fig. 19]
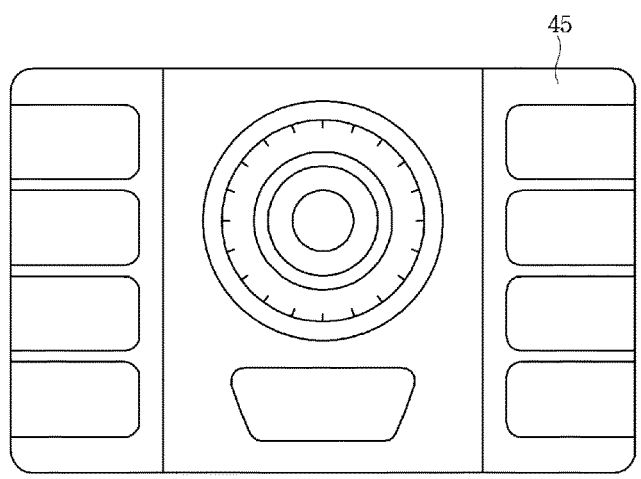
[Fig. 20]
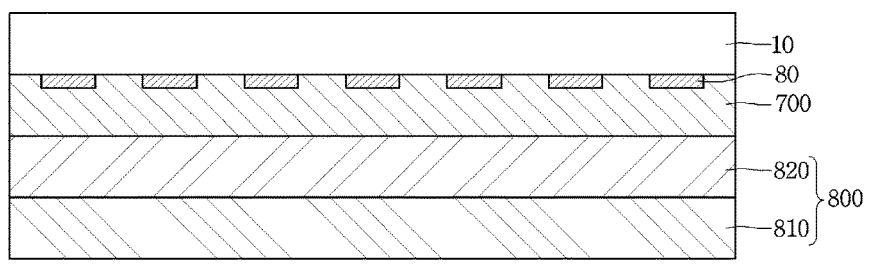
[Fig. 21]
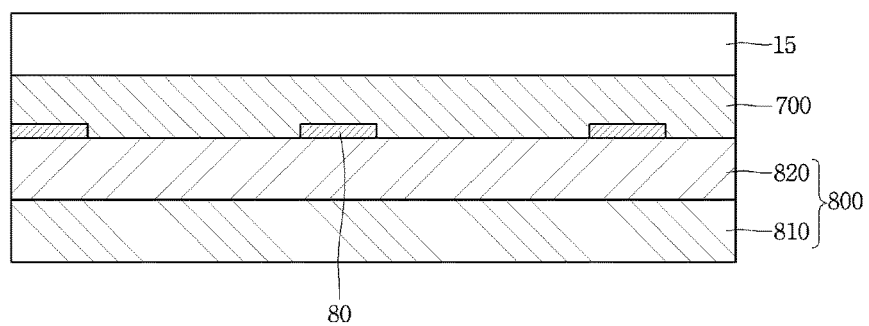

[Fig. 22]
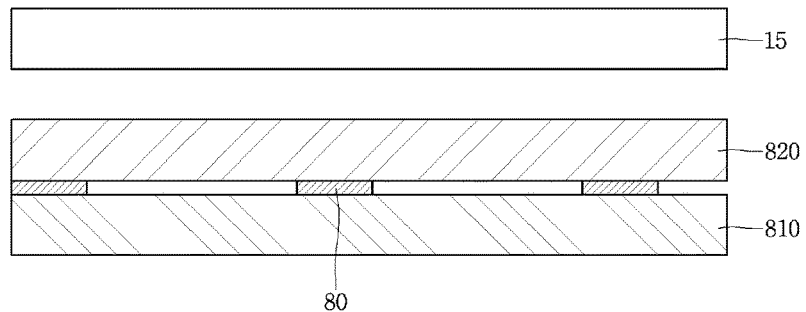
[Fig. 23]
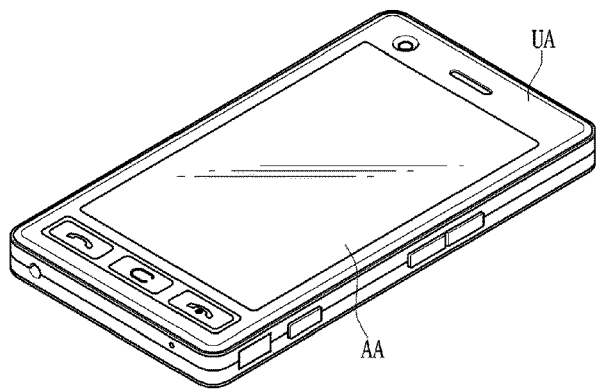
[Fig. 24]
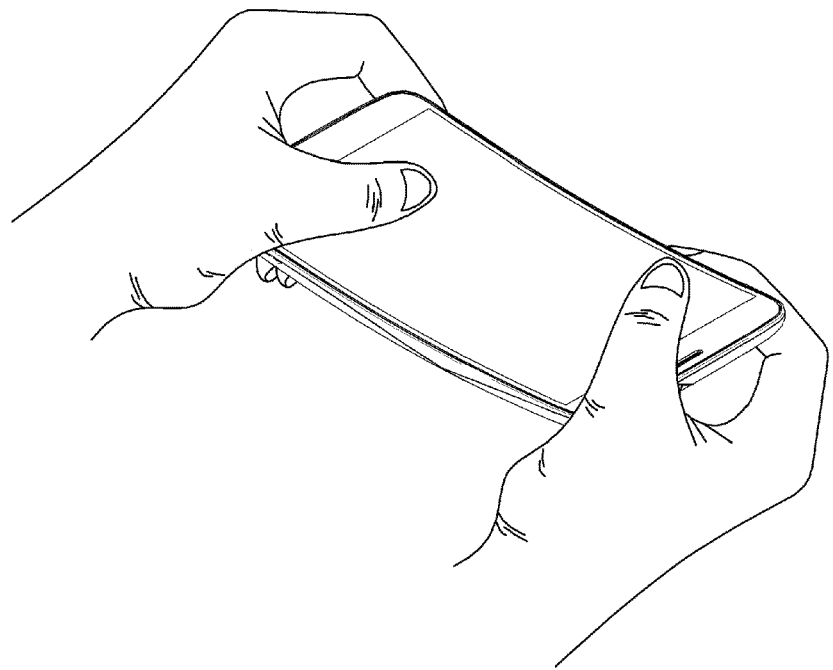

[Fig. 25]
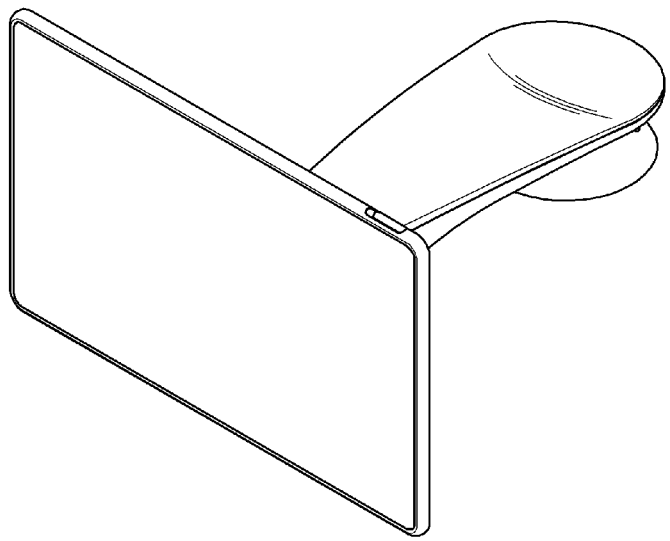
[Fig. 26]

ELECTRONIC DEVICE

CROSS REFERENCE TO RELATED APPLICATIONS

This application is the National Phase of PCT International Application No. PCT/KR2015/003638, filed on Apr. 10, 2015, which claims priority under 35 U.S.C. 119(a) to Patent Application No. 10-2014-0055149, filed in the Republic of Korea on May 8, 2014, Patent Application No. 10-2014-0055150, filed in the Republic of Korea on May 8, 2014, and Patent Application No. 10-2014-0058079, filed in the Republic of Korea on May 14, 2014, all of which are hereby expressly incorporated by reference into the present application.

TECHNICAL FIELD

The embodiment relates to an electronic device.

BACKGROUND ART

As electronic engineering technologies and information technologies are continuously developed, the importance of an electronic apparatus has been steadily increased in daily life including a business environment. Recently, various types of electronic devices have been realized. In addition, newly designed electronic devices equipped with new functions have been emerged.

As described above, as the types of electronic devices encountered in the daily life are gradually diversified and the functions of each electronic device become advanced and complicated, a user interface, which can be easily learned and intuitively handled by a user, has been required.

Accordingly, there is required an electronic device including a novel input device to satisfy the requirement. The input device refers to a device to sense the position touched by the user and to receive the information of the sensed touch position in order to control the overall operation of the electronic device. In addition, the novel input device requires a position detection scheme to more accurately and simply recognize a touch position.

DISCLOSURE OF INVENTION

Technical Problem

The embodiment provides an electronic device including a touch sensing unit.

Solution to Problem

An electronic device according to the embodiment includes a touch sensing unit, and an input unit provided on the touch sensing unit and including a cover substrate having an input pattern. The touch sensing unit includes a substrate including an active area including a plurality of unit cells, and a sensing line provided on the active area of the substrate to perform a sensing operation through a time domain measuring scheme.

Advantageous Effects of Invention

The electronic device according to the embodiment includes the touch sensing unit including the sensing line to perform the sensing operation through a time domain measuring scheme. When comparing with a touch sensing unit employing the capacitive type touch scheme according to the related art, the touch sensing unit can more delicately recognize a touch.

In addition, the touch sensing speed may be increased to several μs (microseconds). Accordingly, the electronic device according to the embodiment can more accurately and rapidly sense a touch position of the touch user, and receive information of the sensed touch position to perform the overall control operation.

In addition, the electronic device according to the embodiment includes flexible substrates to have a flexible characteristic, or is curved or bended to have a curved surface. In addition, the electronic device according to the embodiment includes transparent substrates so that the transparent electronic device or the semitransparent electronic device can be formed. Accordingly, the electronic device can be easily carried and can be variously designed.

BRIEF DESCRIPTION OF DRAWINGS

FIG. 1 is a perspective view showing an electronic device according to a first embodiment.

FIG. 2 is a view showing a touch sensing unit of the electronic device according to a first embodiment.

FIGS. 3 and 4 are graphs to explain a sensing scheme of a sensing line according to the first embodiment.

FIG. 5 is a plan view showing a touch sensing unit according to another embodiment.

FIG. 6 is a view showing an active area and a unit cell of the touch sensing unit.

FIGS. 7 to 11 are views showing an active area and a unit cell of a touch sensing unit according to still another embodiment.

FIG. 12 is a view showing a touch sensing unit of an electronic device according to a second embodiment.

FIGS. 13 and 14 are graphs to explain a sensing scheme of a sensing line according to the second embodiment.

FIG. 15 is a plan view showing the touch sensing unit according to still another embodiment.

FIGS. 16 to 19 are views showing input units of an electronic device according to various embodiments.

FIGS. 20 to 22 are views examples that a display panel is assembled with the electronic device according to the embodiments.

FIGS. 23 to 26 are views showing examples of a touch device employing the electronic device according to the embodiments.

MODE FOR THE INVENTION

In the following description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

In the following description, when a part is connected to the other part, the parts are not only directly connected to each other, but also indirectly connected to each other while interposing another part therebetween. In addition, when a predetermined part "includes" a predetermined component, the predetermined part does not exclude other components, but may further include other components unless otherwise indicated.

The thickness and size of each layer (or film), each region, each pattern, or each structure shown in the drawings may be modified for the purpose of convenience or clarity of the explanation. In addition, the size of elements does not utterly reflect an actual size.

Hereinafter, the embodiment of the present invention will be described in detail with reference to accompanying drawings.

FIG. 1 is a perspective view showing an electronic device according to a first embodiment. FIG. 2 is a view showing a touch sensing unit of the electronic device according to the first embodiment. FIGS. 3 and 4 are graphs to explain a sensing scheme of a sensing line.

Referring to FIGS. 1 and 2, the electronic device according to the embodiment includes a touch sensing unit and an input unit. The input unit may be provided on the touch sensing unit. The input unit is formed therein with an input pattern so that a user can perform a touch operation at a proper position. The touch sensing unit senses a position touched by the user and receives information of the sensed touch position to perform a control operation of the electronic device.

The input unit includes a cover substrate 15 in which an input pattern may be formed.

The touch sensing unit may be provided on the cover substrate 15.

In addition, the touch sensing unit includes a substrate 10. A sensing line 80 is formed on the substrate 10 of the touch sensing unit for the sensing operation through a time domain measuring scheme.

In detail, the substrate 10 of the touch sensing unit includes an active area AA for a touch instruction input of a user. Although drawings show that the boundary of the active area AA is spaced apart from an end portion of the substrate 10, the end portion of the substrate 10 may be identical to the boundary of the active area AA. In other words, if necessary, the entire surface of the substrate 10 may be the active area AA.

A sensing line 80 may be formed on the active area AA. One sensing line 80 may be formed in one active area AA.

In addition, although drawings show only one active area AA and one sensing line 80, the substrate 10 may include a plurality of active areas AA and a plurality of sensing lines 80.

The substrate 10 of the touch sensing unit and the cover substrate 15 of the input unit may include glass or plastic. For example, the substrate 10 or the cover substrate 15 may include chemically tempered/semi-tempered glass, such as soda lime glass or aluminosilicate glass, may include reinforced plastic or flexible plastic, such as polyimide (PI), polyethylene terephthalate (PET), propylene glycol (PPG) or polycarbonate (PC), or may include sapphire. The sapphire has superior electric characteristics, such as permittivity, so that a touch response speed may be greatly increased and a space touch such as hovering may be easily implemented. In addition, since the sapphire has a high surface hardness, the sapphire is applicable to a cover substrate. The hovering signifies a technology of recognizing a coordinate even at a short distance from a display. The substrate 10 or the cover substrate 15 may include chemically tempered/semi-tempered glass, such as soda lime glass or aluminosilicate glass, may include reinforced plastic or flexible plastic, such as polyimide (PI), polyethylene terephthalate (PET), propylene glycol (PPG) or polycarbonate (PC), or may include sapphire. The sapphire has superior electric characteristics, such as permittivity, so that a touch response speed may be greatly increased and a space touch such as hovering may be easily implemented. In addition, since the sapphire has a high surface hardness, the sapphire is applicable to a cover substrate. The hovering signifies a technology of recognizing a coordinate even at a short distance from a display.

In addition, the substrate 10 and the cover substrate 15 may include an optical isotropic film. For example, the substrate 10 and the cover substrate 15 may include cyclic olefin copolymer (COC), cyclic olefin polymer (COP), an optical isotropic polycarbonate (PC), or an optical PMMA.

However, the embodiment is not limited thereto. In other words, the substrate 10 may include various materials sufficient to support the sensing line 80 formed on the substrate 10. In addition, the cover substrate 15 may include various materials sufficient to form an input pattern and to protect the touch sensing unit.

In addition, the substrate 10 and the cover substrate 15 may have a flexible characteristic. In other words, the electronic device according to the embodiment may include a flexible electronic device.

In addition, the substrate 10 and the cover substrate 15 may include a curved or bended substrate. In this case, the electronic device is curved or bended, so that a curved electronic device may be formed. Accordingly, the curved electronic device can be easily carried by a user and can be variously designed.

In addition, the substrate 10 and the cover substrate 15 may be transparent substrates. The electronic device may include a transparent device or a semitransparent substrate. For example, the touch sensing unit has transparency, and the input unit may have a transparent property or a semitransparent property. In this case, the touch sensing unit may include the substrate 10 that is transparent and the sensing line 80, which is transparent, formed on the substrate 10. The input unit may include the cover substrate 15 that is transparent and has a transparent input pattern or a semitransparent input pattern. In other words, as the input pattern includes a transparent input pattern or a semitransparent input pattern, the electronic device may include a transparent electronic device or a semitransparent electronic device.

Accordingly, the transparent electronic device or the semitransparent electronic device may be substituted for transparent glass. In the transparent electronic device or the semitransparent electronic device substituted for the transparent glass, an object or an image on a rear surface of the electronic device may be recognized. In addition, the object or the image on the rear surface of the electronic device may be recognized while the input pattern may be manipulated.

For example, the transparent electronic device or the semitransparent electronic device may be mounted on a window or a keyboard instead of the transparent glass. Further, in order to select the object on the rear surface of the electronic device, the input pattern of the electronic device may be selected or manipulated.

The sensing line 80 may include metal or a transparent conductive material.

For example, the sensing line 80 may include a metallic oxide, such as an indium tin oxide, an indium zinc oxide, a copper oxide, a tin oxide, a zinc oxide, or a titanium oxide. In addition, when the sensing line 80 includes metal, the sensing line 80 has low resistance and allows rapid recognition.

For example, the sensing line 80 may include at least one of Cu, Au, Ag, Al, Ti, Ni, and the alloy thereof.

In addition, the sensing line 80 may include at least one of a nanowire, a photosensitive nanowire film, a carbon nanotube (CNT), grapheme, conductive polymer or the mixture thereof.

When the sensing line 80 includes a transparent conductive material, light may be transmitted through the rear surface of the touch sensing unit and the input unit, and the transparent electronic device or the semitransparent electronic device may be formed. For example, the transparent conductive material may include a metallic oxide such as an indium tin oxide, an indium zinc oxide, a copper oxide, a tin oxide, a zinc oxide, or a titanium oxide.

When the sensing line 80 includes conductive polymer, the transparent electronic device or the semitransparent electronic device may be formed like the case of the transparent conductive material. In addition, since the conductive polymer has a flexible property, the conductive polymer is applicable to a flexible electronic device or a curved-type electronic device. In addition, since the conductive polymer has a low density, a light electronic device may be formed.

In addition, the sensing line 80 may include a conductive pattern. For example, the conductive pattern may be arranged in a mesh shape. The mesh shape may be randomly formed to prevent a moire phenomenon. The moire phenomenon occurs when periodical stripes overlap with each other. Since adjacent stripes overlap with each other, a thickness of a stripe is thickened so that the stripe is spotlighted as compared with other stripes. Thus, in order to prevent such a moire phenomenon, the conductive pattern may be provided in various shapes.

In detail, the conductive pattern may include an opening and a line part. In this case, the line part of the conductive pattern may be in the range of 0.1 μm to 10 μm. The line part of the conductive pattern having the line width of less than 0.1 μm may be impossible in terms of the manufacturing process. When the line width is 10 μm or less, the pattern of the sensing line 80 may not be viewed. Preferably, the line part of the conductive pattern may have the line width in the range of 1 μm to 7 μm. More preferably, the line part of the conductive pattern may have the line width in the range of 2 μm to 5 μm.

In addition, the openings of the conductive pattern may have various shapes including a polygonal shape, such as a rectangular shape, a diamond shape, a pentagonal shape, or a hexagonal shape, or a circular shape and may be uniformly arranged. In other words, the conductive pattern may have a uniform shape.

However, the embodiment is not limited thereto. In other words, the conductive pattern may have an irregular shape. In other words, various conductive pattern openings may be provided in one conductive pattern.

When the sensing line 80 has the mesh shape, even if the sensing line 80 is formed a metallic material, a pattern, which is not viewed, may be formed. In addition, the resistance of the sensing line 80 may be lowered, so that the sensing line 80 may be applied to a large-size substrate or a large-size electronic device. In addition, when the substrate 10 or the electronic device is bent, the sensing line 80 may be bent without the mechanical damage. Accordingly, the bending characteristic and the reliability of the electronic device can be improved.

The sensing line 80 may include a pattern extending in one direction and a pattern extending in a direction different from the one direction. For example, the sensing line 80 may include a linear pattern extending in a first direction and a curved pattern extending in a second direction perpendicular to the first direction.

Patterns having directionality different from each other may be alternately and repeatedly arranged so that the patterns are fully arranged on the entire surface of the active area AA. In other words, the sensing line 80 may have a predetermined symmetrical property and a predetermined repetition property. However, the embodiment is not limited thereto. In other words, various patterns sufficient to be fully formed on the entire surface of the active area AA through repetition arrangement may be formed.

In addition, although not shown in drawings, a ground electrode may be additionally provided adjacent to the sensing line 80. The ground electrode prevents external static electricity or ESD from being introduced into the electronic device. Therefore, the ground electrode can previously prevent the static electricity occurring in the electronic device. Accordingly, the ground electrode can prevent an inter-interference phenomenon to improve the accuracy and the reliability of the touch.

Referring to FIGS. 3 and 4, the sensing line 80 performs a sensing operation through a time domain reflection (TDR) measuring scheme to recognize a touch position. In other words, the sensing line 80 performs the sensing operation through a time domain measuring scheme. The time domain measuring scheme is a scheme to apply a pulse to one end 80a of the sensing line 80, to allow the pulse to travel toward an opposite end 80b of the sensing line 80, and to output a reflected pulse reflected from a touch point through the one end 80a of the sensing line 80.

In detail, a pulse A is applied to the one end 80a of the sensing line 80. As the pulse A travels along the pattern of the sensing line 80, a partial signal B of the pulse A is transmitted and a partial signal C of the pulse A is reflected and returned at a point (touch point T) having impedance higher than that of the applied pulse A. The absolute values of magnitudes of the impedances may be compared with each other.

Meanwhile, the TDR measuring scheme is a scheme to detect the touch position by analyzing the reflected pulse. For example, according to the TDR measuring scheme, the arrival time of the reflected pulse is measured to detect the touch position. In other words, the touch position can be recognized based on a transmission line theory.

In detail, an energy pulse is transmitted through an electrical path (e.g., a sensing line) having a constant impedance. In this case, the sensing line has characteristic impedance. If the sensing line is terminated with the characteristic impedance, the reflected pulse is not transmitted. In other words, if the sensing line is terminated, there is no reflected pulse returning to a starting point of the sensing line from which the pulse is generated.

On the contrary, if the electrically conductive path is unterminated or the impedance variation occurs along the electrically conductive path, a portion or an entire portion of the pulse is reflected to the starting point from which the pulse is generated. In other words, if the sensing line is unterminated, there may exist a positive reflected pulse returning to the starting point of the sensing line from which the transmitted pulse is generated.

In addition, if the impedance different is made in any point along the sensing line, the reflected pulse may be generated and detected. For example, the increase of capacitance along the sensing line (for example, by a finger touch) allows a negative reflected pulse to return to a starting point of the sensing line. The time, in which the reflected pulse returns to the starting point, is used to determine the distance to a point at which the impedance variation occurs.

Accordingly, the touch point T has impedance greater than that of the pulse passing through the sensing line 80 when there is no touch. Accordingly, if the pulse reflected from the touch point is digital-converted and analyzed, data corresponding to a value lower or higher than a threshold value in a time domain can be extracted. Thereafter, x and y (2D) coordinates can be recognized based on an address corresponding to the extracted data of the reflected pulse.

The sensing line 80 includes the one end 80*a* to which a generated pulse is applied and the opposite end 80*b* at which the pulse transmitted along the sensing line 80 is terminated. In this case, the one end 80*a* of the sensing line 80 may be connected with a circuit unit 50.

The circuit unit 50 drives the sensing line 80 so that the sensing operation can be performed. For example, the circuit unit 50 may include a pulse generator and a TDR measuring unit.

The pulse generator applies a pulse to the sensing line 80. The TDR measuring unit converts an analogue-type reflected pulse into digital data, extracts the data of the reflected pulse corresponding to a value lower than or higher than the threshold from the digital data, and recognizes touch coordinates based on the address corresponding to the data.

According to the TDR measuring scheme, the diameter of a touch tip can be reduced. For example, as compared with a conventional capacitive type touch scheme, the diameter of the touch tip can be reduced to a value in the range of 0.5 to 0.8. Accordingly, a touch can be delicately recognized. In addition, as compared with the conventional capacitive type touch scheme, the touch sensing speed can be improved. In other words, the touch sensing speed may be increased to several μs (microseconds).

FIG. 5 is a plan view showing a touch sensing unit according to another embodiment. FIG. 6 is a view showing an active area and a unit cell of the touch sensing unit. In the following description, the details of the structure and the components the same as or similar to those of the above-described embodiment will be omitted.

Referring to FIGS. 5 and 6, the touch sensing unit according to another embodiment includes a substrate 10. The substrate 10 of the touch sensing unit is provided thereon with a sensing line 100 to perform a sensing operation through a time domain measuring scheme.

The substrate 10 of the touch sensing unit includes an active area AA allowing a touch instruction input of a user. The sensing line 100 is formed on the active area AA. One sensing line 100 may be formed in one active area AA. In addition, although the drawings show only one active area AA and one sensing line 100, the substrate 10 may include a plurality of active areas AA and a plurality of sensing lines 100.

The sensing line 100 includes one end 100*a* to which a generated pulse is applied and the opposite end 100*b* at which the pulse transmitted along the sensing line 100 is terminated. In this case, the one end 100*a* of the sensing line 100 may be connected with a circuit unit 50.

The circuit unit 50 drives the sensing line 100 so that the sensing operation can be performed. For example, the circuit unit 50 may include a pulse generator and a TDR measuring unit.

The pulse generator applies a pulse to the sensing line 100. The TDR measuring unit converts an analogue-type reflected pulse into digital data, extracts the data of the reflected pulse corresponding to a value lower than or higher than the threshold from the digital data, and recognizes touch coordinates based on the address corresponding to the data.

According to the TDR scheme, a touch gesture as well as a touch position can be recognized. In other words, a touch gesture such as drawing can be recognized. In addition, according to the TDR scheme, a repeated touch motion can be recognized. Accordingly, a differentiated user interface can be provided, and the experience of the user can be enlarged.

According to the TDR measuring scheme, the diameter of a touch tip can be reduced. For example, as compared with a conventional capacitive type touch scheme, the diameter of the touch tip can be reduced to a value in the range of 0.5 to 0.8. Accordingly, a touch can be delicately recognized. In addition, as compared with the conventional capacitive type touch scheme, the touch sensing speed can be improved. In other words, the touch sensing speed may be increased to several μs (microseconds).

In the sensing line 100 according to another embodiment, unit patterns are repeatedly arranged in at least two directions different from each other so that the unit patterns are fully provided on the entire surface of the active area AA. Accordingly, the difference between the length of a pattern extending in the first direction and the length of a pattern extending in a second direction is minimized in the unit pattern, thereby preventing the impedance from being rapidly reduced, and reducing impedance noise, and improving touch sensitivity.

Referring to FIG. 6, the active area AA is divided into a plurality of unit cells UC. The unit cells UC may include the same pattern (hereinafter, a unit pattern). The unit cell may be formed in a circular shape or a polygonal shape. Among them, the UC may be formed in a rectangular shape. In this case, the unit cells UC may be repeated in at least two directions different from each other.

For example, when the unit cell UC has the rectangular shape, one unit cell UC makes contact with another unit cell UC in the first direction while making contact with still another unit cell UC in the second direction. Accordingly, the first direction may be perpendicular to the second direction.

The sensing line 100 is formed on the active area AA of the substrate 10. The sensing line 100 may be fully arranged on the entire surface of the active area AA. The sensing line 100 includes a first sensing pattern 101 and a second sensing pattern 102. The first sensing pattern 101 is a unit pattern formed in one unit cell UC, and the second sensing pattern 102 is a connection pattern to connect a unit pattern formed in one unit cell UC with a unit pattern formed in another unit cell UC.

In detail, in a plurality of unit cells UC provided in the active area AA, one unit pattern is formed in one unit cell UC. The first sensing pattern 101 refers to one unit pattern formed in the unit cell UC.

In addition, the second sensing pattern 102 is a pattern to connect the first sensing pattern 101 formed in one unit cell UC with the first sensing pattern 101 formed in another unit cell UC. In this case, the first and second sensing patterns 101 and 102 may be integrally formed.

The first sensing pattern 101 may include a plurality of node points. Two node points may be included in the first sensing pattern 101. The first sensing pattern 101 includes patterns extending in mutually different directions based on the node point. For example, the first sensing pattern 101 may include a U-shape pattern. The first sensing pattern 101 may include a pattern extending in the first direction and a pattern extending in the second direction based on one node point.

In this case, the ratio of the length of the pattern extending in the first direction to the length of the pattern extending in the second direction based on one node point may be ranged from 1:5 to 5:1. Preferably, the ratio of the length of the pattern extending in the first direction to the length of the pattern extending in the second direction based on one node point may be ranged from 1:2 to 2:1. More preferably, the length of the pattern extending in the first direction may be substantially equal to the length of the pattern extending in the second direction based on one node point.

When the unit cells UC including the U-shape unit pattern are repeatedly arranged only in one direction, the difference between the length of the pattern extending in the first direction and the length of the pattern extending in the second direction is greatly made in the U-shape unit pattern. Accordingly, the impedance variation per unit length of 1 m of the sensing line may be more than 50%. In other words, when the pulse travels toward the opposite end, the impedance of the sensing line is rapidly reduced, and the impedance of the reflected pulse does not have a sufficiently great value, so that the touch may not be recognized. On the contrary, in the sensing line 100 according to another embodiment, the difference between the length of the pattern extending in the first direction and the length of the pattern extending in the second direction in the unit pattern is reduced, so that the impedance difference between the one end 100a of the sensing line 100 and the opposite end 100b of the sensing line 100 can be reduced.

In detail, when two predetermined points are selected on the sensing line 100, the impedance at a point adjacent to the opposite end 100b of the sensing line 100 may be less than the impedance at a point adjacent to the one end 100a of the sensing line 100. The impedance difference between two points may be 40% or less of the impedance at one point. For example, the impedance difference between two points may be 40% or less of the impedance at a point adjacent to the one end 100a. The impedance at a point adjacent to the opposite end 100b of the sensing line 100 may be formed to 60% or more of the impedance at a point adjacent to the one end 100a. In this case, the distance of the sensing line 100 between two points may be 1 m or more.

In other words, the impedance difference per unit length of the sensing line 100 may be 40% or less. The unit length may be 1 m. Accordingly, a touch at a distance of 2 m or more from one end 100a of the sensing line 100 can be recognized. The sensing line 100 according to the embodiment may be applied to a touch sensing unit having an area larger than that of a conventional touch sensing unit.

For example, when the impedance at one end of a sensing line of 1 m having the line width of 70 μm is 200Ω, the impedance at an opposite end of the sensing line may be 100Ω or less. Under conditions of the same line width, length, and linear resistance, when the impedance at one end of the sensing line according to the present invention is 200Ω, the impedance at the opposite end of the sensing line may be 120Ω or more.

In this case, when the touch sensing unit of 2 inches is formed, the sensing line of 2 m or longer may be required. Although the sensing line of 2 m or longer may not be formed according to the related art, since the sensing line 100 according to another embodiment may have the length of 2 m or longer, the sensing line may be applied to the touch sensing unit of 2 inches or more.

Preferably, the impedance difference per unit length of the sensing line 100 may be 20% or less. More preferably, the impedance difference per unit length of the sensing line 100 may be 10% or less. As the impedance difference per unit length has a smaller value, the sensing line can be applied to a touch sensing unit having a larger area. The impedance difference per unit length of the sensing line 100 may be controlled by adjusting the difference between the length of the pattern extending in the first direction and the length of the pattern extending in the second direction in the unit pattern. For example, when the impedance at one end of a sensing line having the length of 1 m and the line width of 70 μm is 200Ω, the impedance at an opposite end of the sensing line may be 100Ω or less. Under conditions of the same line width, length, and linear resistance, when the impedance at one end of the sensing line according to the present invention is 200Ω, the impedance at the opposite end of the sensing line may be 180Ω or more.

In this case, when the touch sensing unit of 5 inches is formed, the sensing line of 4 m may be required. According to the sensing line of the related art, since the impedance is rarely made at a point having the length of about 2 m, a pulse reflected from a point exceeding the length of 2 m cannot be recognized, so that the touch cannot be recognized. According to the sensing line of the present invention, the reflected pulse can be recognized at a point having a length of about 10 m, so that the touch can be recognized. Accordingly, the sensing line according to the present invention can provide the touch sensing unit having improved reliability.

The second sensing pattern 102 formed in one unit cell UC connects the first sensing pattern 101 formed in the unit cell UC with the first sensing pattern 101 formed in another unit cell UC. In other words, second sensing patterns 102 may be connected with one end and an opposite end of the first sensing pattern 101 formed in the unit cell UC. The second sensing pattern 102 connected with the one end of the first sensing pattern 101 and the second sensing pattern 102 connected with the opposite end of the first sensing pattern 101 may extend in mutually different directions.

In this case, the second sensing pattern 102 may be connected with the first sensing pattern 101 of another unit cell UC provided in the first direction from the unit cell UC. In addition, the second sensing pattern 102 may be connected with the first sensing pattern 101 of another unit cell UC provided in the second direction from the unit cell UC. In other words, second sensing patterns 102 extending in two directions different from each other ma be formed in one unit cell UC.

In detail, the second sensing pattern 102 may connect the unit cell UC with another unit cell UC making contact with the unit cell UC in the first direction. In addition, the second sensing pattern 102 may connect the unit cell UC with another unit cell UC making contact with the unit cell UC in the second direction.

Accordingly, the touch sensing unit according to another embodiment includes the sensing line 100 including a plurality of unit patterns provided in at least two directions different from each other. In the sensing line 100, the difference in length between patterns extending in mutually different directions based on one node point can be minimized. Accordingly, the impedance of the sensing line can be prevented from being rapidly reduced, and the impedance noise can be reduced, so that the touch sensitivity can be improved.

FIGS. 7 to 11 are views showing an active area and a unit cell of a touch sensing unit according to still another embodiment.

Hereinafter, the touch sensing unit according to still another embodiment will be described with reference to FIG. 7. In the following description of the touch sensing unit according to another embodiment, the details of the structure and the components the same as or similar to those of the touch sensing unit according to the above-described embodiment will be omitted.

Referring to FIG. 7, the touch sensing unit according to another embodiment includes an active area AA in which a touch instruction input of a user is possible. The active area AA is divided into a plurality of unit cells UC.

The unit cell UC may be formed in a rectangular shape. In this case, the unit cells UC may be repeatedly arranged such that the unit cells UC extend in a first direction and a second direction different from the first direction. In this case, the first direction may be perpendicular to the second direction.

A sensing line 200 is formed on the active area AA. The sensing line 200 may perform a sensing operation through the TDR measuring scheme, so that the touch position can be recognized. A pulse generator may be connected with one end of the sensing line 200 so that a pulse is applied to the one end, and the pulse travels from one end of the sensing line 200 to an opposite end of the sensing line 200.

The sensing line 200 includes a first sensing pattern 201 serving as a unit pattern formed in each of the unit cells UC and a second sensing pattern 202 to connect unit patterns formed in mutually different unit cells UC with each other. In this case, the first and second sensing patterns 201 and 202 may be formed integrally with each other. Accordingly, the sensing line 200 may be fully provided on the entire surface of the active area AA.

The first sensing pattern 201 may include a plurality of node points. The first sensing pattern 201 may include four node points. The first sensing pattern 201 may include patterns extending in mutually different directions based on the node points. For example, the first sensing pattern 201 may include U-shape patterns, and may include patterns extending in the first and second directions based on one node point.

In this case, the ratio of the length of the pattern extending in the first direction to the length of the pattern extending in the second direction based on one node point may be ranged from 1:5 to 5:1. Preferably, the ratio of the length of the pattern extending in the first direction to the length of the pattern extending in the second direction based on one node point may be ranged from 1:2 to 2:1. More preferably, the length of the pattern extending in the first direction may be substantially equal to the length of the pattern extending in the second direction based on one node point.

According to the sensing line 200 of the present invention, the difference between the length of the pattern extending in the first direction and the length of the pattern extending in the second direction is reduced in the unit pattern. Accordingly, the impedance difference between the one end and the opposite end of the sensing line 200 can be reduced. Preferably, the impedance difference per unit length of the sensing line 200 may be 40% or less. In this case, the unit length may be 1 m.

In detail, when two predetermined points are selected within the unit length of the sensing line 200, the impedance at a point adjacent to the opposite end of the sensing line 200 may be less than the impedance at a point adjacent to the one end of the sensing line 200. The impedance difference between two points may be 40% or less of the impedance at one point adjacent to the one end. The impedance at the point adjacent to the opposite end may be formed to 60% or more of the impedance at the point adjacent to the one end within the unit length of the sensing line 200.

Preferably, the impedance difference per unit length of the sensing line 200 may be 20% or less. More preferably, the impedance difference per unit length of the sensing line 200 may be 10% or less.

The second sensing pattern 202 formed in one unit cell UC connects the first sensing pattern 201 formed in the unit cell UC with the first sensing pattern 201 formed in another unit cell UC. In other words, second sensing patterns 202 may be connected with one end and an opposite end of the first sensing pattern 201 formed in the unit cell UC.

In this case, the second sensing pattern 202 may be connected with the first sensing pattern 201 of another unit cell UC provided in the first direction from the unit cell UC. In addition, the second sensing pattern 202 may be connected with the first sensing pattern 201 of another unit cell UC provided in the second direction from the unit cell UC. In other words, second sensing patterns 202 extending in the mutually different directions may be formed in one unit cell UC.

In detail, the second sensing pattern 202 may connect the unit cell UC with another unit cell UC making contact with the unit cell UC in the first direction. In addition, the second sensing pattern 202 may connect the unit cell UC with another unit cell UC making contact with the unit cell in the second direction.

Accordingly, the touch sensing unit according to another embodiment includes the sensing line 200 including a plurality of unit patterns. The unit patterns are repeatedly arranged in the first direction while being repeatedly arranged in the second direction. The unit pattern includes patterns extending in mutually different directions based on one node point and can minimize the difference between lengths extending in mutually different direction based on the node point. Accordingly, the impedance of the sensing line can be prevented from being rapidly reduced, impedance noise can be reduced, and the touch sensitivity can be improved.

Hereinafter, a touch sensing unit according to still another embodiment will be described with reference to FIG. 8. In the following description of the touch sensing unit according to still another embodiment, the details of the structure and the components the same as or similar to those of the touch sensing unit according to the above-described embodiment will be omitted.

Referring to FIG. 8, the touch sensing unit according to still another embodiment includes an active area AA in which a touch instruction input of a user is possible. The active area AA is divided into a plurality of unit cells UC.

The unit cell UC may be formed in a rectangular shape. In this case, the unit cells UC may be repeatedly arranged so that the unit cells UC extend in a first direction and a second direction different from the first direction. In this case, the first direction may be perpendicular to the second direction.

A sensing line 300 is formed on the active area AA. A pulse may be applied to one end of the sensing line 300, and travels from the one end of the sensing line 300 to an opposite end.

The sensing line 300 includes a first sensing pattern 301 serving as a unit pattern formed in each of the unit cells UC and a second sensing pattern 302 to connect unit patterns formed in mutually different unit cells UC with each other. In this case, the first and second sensing patterns 301 and 302 may be formed integrally with each other. Accordingly, the sensing line 300 may be fully provided on the entire surface of the active area AA.

The first sensing pattern 301 may include a plurality of node points. Two node points may be included in the first sensing pattern 301. The first sensing pattern 301 includes patterns extending in mutually different directions based on the node point. For example, the first sensing pattern 301 may include a Z-shape pattern. The first sensing pattern 301 may include a pattern extending in one direction and a pattern extending in another direction different from the one direction based on one node point.

In this case, the ratio of the length of the pattern extending in one direction to the length of the pattern extending in another direction based on one node point may be ranged from 1:5 to 5:1. Preferably, the ratio of the length of the pattern extending in the one direction to the length of the pattern extending in another direction based on one node point may be ranged from 1:2 to 2:1. More preferably, the length of the pattern extending in the one direction may be equal to the length of the pattern extending in another direction based on one node point.

The second sensing pattern 302 formed in one unit cell UC connects the first sensing pattern 301 formed in the unit cell UC with the first sensing pattern 301 formed in another unit cell UC. In other words, the second sensing patterns 302 may be connected with one end and an opposite end of the first sensing pattern 301 formed in the unit cell UC.

The second sensing pattern 302 may be connected with the first sensing pattern 301 of another unit cell UC provided in the first direction from the unit cell UC. In addition, the second sensing pattern 302 may be connected with the first sensing pattern 301 of another unit cell UC provided in the second direction from the unit cell UC. In other words, second sensing patterns 302 extending in two directions different from each other may be formed in one unit cell UC.

In detail, the second sensing pattern 302 may connect the unit cell UC with another unit cell UC spaced apart from the unit cell UC. In addition, the second sensing pattern 302 may connect the unit cell UC with another unit cell making contact with the unit cell UC. One of the second sensing patterns 302 extending in mutually different directions may extend another unit cell UC making contact with the unit cell UC, and another of the second sensing patterns 302 may extend to still another unit cell spaced apart from the unit cell UC.

According to the sensing line 300 of still another embodiment, the difference between the length of a pattern extending in the one direction and the length of the pattern extending in the another direction is reduced, so that the impedance difference between the one end and the opposite end of the sensing line 300 can be reduced. Preferably, the impedance difference per length of the sensing line 300 may be 40% or less. The unit length may be 1 m.

In detail, when two predetermined points are selected within the unit length of the sensing line 300, the impedance at a point adjacent to the opposite end of the sensing line 300 may be less than the impedance at a point adjacent to the one end of the sensing line 300. The impedance difference between two points may be 40% or less of the impedance at a point to the one end. The impedance at the point adjacent to the opposite end of the sensing line 300 may be formed to 60% or more of the impedance at the point adjacent to the one end of the sensing line 300 within the unit length.

Preferably, the impedance difference per unit length of the sensing line 300 may be 20% or less. More preferably, the impedance difference per unit length of the sensing line 300 may be 10% or less. Accordingly, the impedance of the sensing line can be prevented from being rapidly reduced, impedance noise can be reduced, and touch sensitivity can be improved.

Hereinafter, a touch sensing unit according to still another embodiment will be described with reference to FIG. 9. In the following description of the touch sensing unit according to still another embodiment, the details of the structure and the components the same as or similar to those of the touch sensing unit according to the above-described embodiment will be omitted.

Referring to FIG. 9, the touch sensing unit according to the embodiment includes an active area AA in which a touch instruction input of a user is possible. The active area AA is divided into a plurality of unit cells UC.

The unit cell UC may be formed in a rectangular shape. In this case, the unit cells UC may be repeatedly arranged so that the unit cells UC extend in a first direction and a second direction different from the first direction. In this case, the first direction may be perpendicular to the second direction.

A sensing line 400 is formed on the active area AA. A pulse may be applied to the one end of the sensing line 400, and the pulse travels from one end of the sensing line 400 to an opposite end of the sensing line 400.

The sensing line 400 includes a first sensing pattern 401 serving as a unit pattern formed in each of multiple unit cells UC and a second sensing pattern 402 to connect unit patterns formed in mutually different unit cells UC with each other. In this case, the first and second sensing patterns 401 and 402 may be formed integrally with each other. Accordingly, the sensing line 400 may be fully provided on the entire surface of the active area AA.

The first sensing pattern 401 may include a plurality of node points. Two node points may be included in the first sensing pattern 401. The first sensing pattern 401 includes patterns extending in mutually different directions based on the node point. For example, the first sensing pattern 401 may include a U-shape pattern. The first sensing pattern 401 may include a pattern extending in the first direction and a pattern extending in the second direction based on one node point.

In this case, the ratio of the length of the pattern extending in one direction to the length of the pattern extending in another direction based on one node point may be ranged from 1:5 to 5:1. Preferably, the ratio of the length of the pattern extending in one direction to the length of the pattern extending in another direction based on one node point may be ranged from 1:2 to 2:1. More preferably, the length of the pattern extending in one direction may be substantially equal to the length of the pattern extending in another direction based on one node point.

The second sensing pattern 402 may be connected with one end and an opposite end of the first sensing pattern 401 formed in the unit cell UC. The second sensing pattern 402 may be connected with the first sensing pattern 401 of another unit cell provided in the first direction from the unit cell UC. In addition, the second sensing pattern 402 may be connected with the first sensing pattern 401 of another unit cell UC provided in the second direction from the unit cell UC. In other words, second sensing patterns 402 extending in two directions different from each other ma be formed in one unit cell UC.

In this case, the second sensing pattern 402 may connect the unit cell UC with another unit cell UC spaced apart from the unit cell UC. In addition, the second sensing pattern 402 may connect the unit cell UC with another unit cell making contact with the unit cell UC. In other words, the second sensing patterns 402 may include various patterns sufficient to connect the unit cell UC with another unit cell UC provided in the first direction or the second direction from the unit cell UC, and may be irregularly arranged.

In the sensing line 400 according to still another embodiment, the difference between the length of the pattern extending in the first direction and the length of the pattern extending in the second direction in the unit pattern is reduced, so that the impedance difference between the one end and the opposite end of the sensing line 400 can be reduced.

In detail, when two predetermined points are selected within the unit length of the sensing line 400, the impedance at a point adjacent to the opposite end of the sensing line 400 may be less than the impedance at a point adjacent to the one end of the sensing line 400. The impedance difference between two points may be 40% or less of the impedance at one point adjacent to the one end. The impedance at the point adjacent to the opposite end of the sensing line 400 may be formed to 60% or more of the impedance at the point adjacent to the one end within the unit length. The unit length may be 1 m.

Preferably, the impedance difference per unit length of the sensing line 400 may be 20% or less. More preferably, the impedance difference per unit length of the sensing line 400 may be 10% or less. Accordingly, the impedance of the sensing line can be prevented from being rapidly reduced, and the impedance noise can be reduced, so that the touch sensitivity can be improved.

Hereinafter, a touch sensing unit according to still another embodiment will be described with reference to FIG. 10. In the following description of the touch sensing unit according to still another embodiment, the details of the structure and the components the same as or similar to those of the touch sensing unit according to the above-described embodiment will be omitted.

Referring to FIG. 10, the touch sensing unit according to the embodiment includes an active area AA in which a touch instruction input of a user is possible. The active area AA is divided into a plurality of unit cells UC.

The unit cell UC may have a triangular shape. In this case, a plurality of unit cells UC may be repeatedly arranged so that that the unit cells UC may extend in a first direction, a second direction, and a third direction. In this case, the first to third directions form an angle of 120° with respect to each other.

A sensing line 500 is formed on the active area AA. A pulse may be applied to the one end of the sensing line 500, and the pulse travels from one end to an opposite end of the sensing line 500.

The sensing line 500 includes a first sensing pattern 501 serving as a unit pattern formed in each of the unit cells UC and a second sensing pattern 502 to connect unit patterns formed in mutually different unit cells UC with each other. In this case, the first and second sensing patterns 501 and 502 may be formed integrally with each other. Accordingly, the sensing line 500 may be fully provided on the entire surface of the active area AA.

The first sensing pattern 501 may include a plurality of node points. Two node points may be included in the first sensing pattern 501. The first sensing pattern 501 includes patterns extending in mutually different directions based on the node point. For example, the first sensing pattern 501 may include a pattern extending in one direction and a pattern extending in another direction based on one node point.

In this case, the ratio of the length of the pattern extending in one direction to the length of the pattern extending in another direction based on one node point may be ranged from 1:5 to 5:1. Preferably, the ratio of the length of the pattern extending in one direction to the length of the pattern extending in another direction based on one node point may be ranged from 1:2 to 2:1. More preferably, the length of the pattern extending in one direction may be equal to the length of the pattern extending in another direction based on one node point.

The second sensing pattern 502 may be connected with one end and an opposite end of the first sensing pattern 501 formed in the unit cell UC. The second sensing pattern 502 may be connected with first sensing patterns 501 of unit cells UC different from each other and arranged in two directions selected from the group consisting of first to third directions. In other words, second sensing patterns 502 may be formed in one unit cell UC to extend in two directions different from each other.

In detail, the second sensing patterns 502 may connect the unit cell UC with other unit cells UC making contact with the unit cell UC in the first and second directions. In addition, the second sensing patterns 502 may connect the unit cell UC with other unit cells UC making contact with the unit cell UC in the first and third directions. In addition, the second sensing patterns 502 may connect the unit cell UC with other unit cells UC making contact with the unit cell UC in the second and third directions.

In the sensing line 500 according to still another embodiment, the difference between the length of the pattern extending in one direction and the length of the pattern extending in another direction in the unit pattern is reduced, so that the impedance difference between the one end and the opposite end of the sensing line 500 can be reduced.

In detail, when two predetermined points are selected within the unit length of the sensing line 500, the impedance difference between two points may be 40% or less of the impedance at one point adjacent to one end. The impedance at the point adjacent to opposite end may be formed to 60% or more of the impedance at the point adjacent to the one end within the unit length of the sensing line 500. The unit length may be 1 m.

Preferably, the impedance difference per unit length of the sensing line 500 may be 20% or less. More preferably, the impedance difference per unit length of the sensing line 500 may be 10% or less. Accordingly, the impedance of the sensing line can be prevented from being rapidly reduced, and the impedance noise can be reduced, so that the touch sensitivity can be improved.

Hereinafter, a touch sensing unit according to still another embodiment will be described with reference to FIG. 11. In the following description of the touch sensing unit according to still another embodiment, the details of the structure and the components the same as or similar to those of the touch sensing unit according to the above-described embodiment will be omitted.

Referring to FIG. 11, the touch sensing unit according to still another embodiment includes an active area AA in which a touch instruction input of a user is possible. The active area AA is divided into a plurality of unit cells UC. The sensing line 600 is formed on the active area AA, and the pulse applied to one end of the sensing line 600 travels to an opposite end of the sensing line 600.

The unit cells UC may have various shapes sufficient to include the same unit pattern, and may be formed in an irregular shape. In other words, the unit cell UC includes a first sensing pattern 601 serving as a unit pattern and a second sensing pattern 602 to connect unit patterns formed in mutually different unit cells UC. The first and second sensing patterns 601 and 602 may be formed integrally with each other. Accordingly, the sensing line 600 may be fully provided on the entire surface of the active area AA.

The first sensing pattern 601 may include a plurality of node points. Six node points may be included in the first sensing pattern 601. The first sensing pattern 601 includes patterns extending in mutually different directions based on the node point. For example, the first sensing pattern 601 may include a pattern extending in the first direction and a pattern extending in the second direction based on one node point. The first and second directions may be perpendicular to each other.

In this case, the ratio of the length of the pattern extending in the first direction to the length of the pattern extending in the second direction based on one node point may be ranged from 1:5 to 5:1. Preferably, the ratio of the length of the pattern extending in the first direction to the length of the pattern extending in the second direction based on one node point may be ranged from 1:2 to 2:1. More preferably, the length of the pattern extending in the first direction may be substantially equal to the length of the pattern extending in the second direction based on one node point.

The second sensing pattern 602 may be connected with one end and an opposite end of the first sensing pattern 601 formed in the unit cell UC. The second sensing pattern 602 may be connected with the first sensing pattern 601 of another unit cell UC adjacent to the unit cell UC.

In the sensing line 600 according to still another embodiment, the difference between the length of the pattern extending in one direction and the length of the pattern extending in another direction in the unit pattern is reduced, so that the impedance difference between the one end and the opposite end of the sensing line 600 can be reduced.

In detail, when two predetermined points are selected within the unit length of the sensing line 600, the impedance difference between two points may be 40% or less of the impedance at one point adjacent to the one end. In other words, the impedance at the point adjacent to the opposite end may be formed to 60% or more of the impedance at the point adjacent to the one end within the unit length of the sensing line 600. The unit length may be 1 m.

Preferably, the impedance difference per unit length of the sensing line 600 may be 20% or less. More preferably, the impedance difference per unit length of the sensing line 600 may be 10% or less. Accordingly, the impedance of the sensing line can be prevented from being rapidly reduced, and the impedance noise can be reduced, so that the touch sensitivity can be improved.

FIG. 12 is a view showing a touch sensing unit of an electronic device according to a second embodiment. FIGS. 13 and 14 are graphs to explain a sensing scheme of a sensing line.

Hereinafter, the electronic device according to the second embodiment will be described with reference to FIGS. 12 to 14. In the following description of the electronic device according to the second embodiment, the details of the structure and the components the same as or similar to those of the electronic device according to the previous embodiment described above will be omitted.

Referring to FIG. 12, the electronic device according to the second embodiment includes a touch sensing unit and an input unit. The input unit may be provided on the touch sensing unit. The input unit is formed therein with an input pattern so that a user can perform a touch operation at a proper position. The touch sensing unit senses a position touched by the user and receives information of the sensed touch position to perform a control operation of the electronic device.

The input unit includes a cover substrate 15 in which an input pattern may be formed.

The touch sensing unit may be provided on the cover substrate 15.

The touch sensing unit includes a substrate 10.

The substrate 10 of the touch sensing unit includes an active area AA for a touch instruction input of a user. A sensing line 80 is formed on the active area AA. One sensing line 80 may be formed in one active area AA. In addition, although drawings show only one active area AA and one sensing line 80, the substrate 10 may include a plurality of active areas AA and a plurality of sensing lines 80.

Although drawings show that the boundary of the active area AA is spaced apart from an end portion of the substrate 10, the end portion of the substrate 10 may be identical to the boundary of the active area AA. In other words, if necessary, the entire surface of the substrate 10 may be the active area AA.

The substrate 10 may include glass or plastic. For example, the substrate 10 may include tempered glass, semi-tempered glass, sodalime glass or reinforced plastic.

In addition, the substrate 10 may include an optical isotropic film. For example, the substrate 10 may include COC, COP, an optical isotropic PC, or an optical isotropic PMMA. The optical isotropic film has an equal refractive index or an approximately equal refractive index in all direction, thereby improving a moire phenomenon, a blackout phenomenon (screen is viewed in black at a specific angle) and a rainbow phenomenon (rainbow light stain). Accordingly, visibility can be improved.

However, the embodiment is not limited thereto. In other words, the substrate 10 may include various materials sufficient to support the sensing line 80 formed on the substrate 10.

The sensing line 80 may include a transparent conductive material allowing electricity to flow without the interruption of light transmission. To this end, the sensing line 80 may include a metallic oxide, such as an indium tin oxide, an indium zinc oxide, a copper oxide, a tin oxide, a zinc oxide, or a titanium oxide. The sensing line 80 may include a nanowire, a photosensitive nanowire film, a carbon nanotube (CNT), grapheme, or various metals. In particular, the sensing line 80 may include Cu, Au, Ag, Al, Ti, Ni, or the alloy thereof. In addition, the sensing lien 80 may include conductive polymer.

In addition, the sensing line 80 may include a conductive pattern. For example, the conductive pattern may be arranged in a mesh shape. The mesh shape may be randomly formed to prevent a moire phenomenon. The moire phenomenon occurs when periodical stripes overlap with each other. Since adjacent stripes overlap with each other, a thickness of a stripe is thickened so that the stripe is spotlighted as compared with other stripes. Thus, in order to prevent such a moire phenomenon, the conductive pattern may be provided in various shapes.

In detail, the conductive pattern may include an opening and a line part. In this case, the line part of the conductive pattern may be in the range of 0.1 μm to 10 μm. The line part of the conductive pattern having the line width of less than 0.1 μm may be impossible in terms of the manufacturing process. When the line width is 10 μm or less, the pattern of the sensing line 80 may not be viewed. Preferably, the line part of the conductive pattern may have the line width in the range of 1 μm to 7 μm. More preferably, the line part of the conductive pattern may have the line width in the range of 2 μm to 5 μm.

In addition, the openings of the conductive pattern may have various shapes including a polygonal shape, such as a rectangular shape, a diamond shape, a pentagonal shape, or a hexagonal shape, or a circular shape and may be uniformly arranged. In other words, the conductive pattern may have a uniform shape.

However, the embodiment is not limited thereto. In other words, the conductive pattern may have an irregular shape. In other words, various conductive pattern openings may be provided in one conductive pattern.

When the sensing line 80 has the mesh shape, even if the sensing line 80 is formed a metallic material, a pattern, which is not viewed, may be formed. In addition, the resistance of the touch sensing unit may be lowered even if the sensing line 80 is applied to a large-size touch sensing unit. In addition, when the touch sensing unit is bent, the sensing line 80 may be bent without the mechanical damage. Accordingly, the bending characteristic and the reliability of the touch sensing unit can be improved.

The sensing line 80 may include a pattern extending in one direction and a pattern extending in a direction different from the one direction. For example, the sensing line 80 may include a linear pattern extending in a first direction and a curved pattern extending in a second direction perpendicular to the first direction.

Patterns having directionality different from each other may be alternately and repeatedly arranged so that the patterns can be fully arranged on the entire surface of the active area AA. In other words, the sensing line 80 may have a predetermined symmetrical property and a predetermined repetition property. However, the embodiment is not limited thereto. In other words, various patterns sufficient to be fully formed on the entire surface of the active area AA through repetition arrangement may be formed.

In addition, although not shown in drawings, a ground electrode may be additionally provided adjacent to the sensing line 80. The ground electrode prevents external static electricity or ESD from being introduced into the device. In other words, the ground electrode can previously prevent the static electricity or the ESD from being introduced into the device as the static electricity or the ESD is moved along the path of the sensing line 80. Therefore, the ground electrode can previously prevent the static electricity occurring in the electronic device, and can prevent sensing failure. Accordingly, the ground electrode can prevent a signal interference to improve the accuracy and the reliability of the touch.

Referring to FIGS. 13 and 14, the sensing line 80 performs a sensing operation through a time domain transmission (TDT) measuring scheme to recognize a touch position. In other words, the sensing line 80 performs the sensing operation through a time domain measuring scheme.

The TDT measuring scheme is a scheme to apply a pulse to one end 80a of the sensing line 80, to allow the pulse to travel toward an opposite end 80b of the sensing line 80, and to recognize and output a transmission pulse transmitted through a touch point at the one end 80a of the sensing line 80.

In detail, a pulse A is applied to the one end 80a of the sensing line 80. As the pulse A travels along the pattern of the sensing line 80, a partial pulse C is reflected and a partial signal B of the pulse A is transmitted to travel at a point (touch point T) having impedance higher than that of the applied pulse A. The absolute values of magnitudes of the impedances may be compared with each other.

The previous embodiment provides a TDR measuring scheme to detect the touched position by analyzing the reflected pulse reflected from the touch point. When the sensing line 80 is generally touched as shown in FIG. 3, the transmission pulse B has impedance higher than that of the reflected pulse C. Accordingly, the touch sensing unit according to the present embodiment has reliability more improved as compared with touch sensing unit employing the TDR (time domain reflection) scheme to recognize the touch point by recognizing the reflected pulse.

The TDR measuring scheme is a scheme to detect the touch position by analyzing the pulse transmitted through the touch point (hereinafter, transmission pulse). For example, according to the TDR measuring scheme, the transmission pulse and the pulse travelling (hereinafter, traveling pulse) without being transmitted at the touch point are distinguished therebetween, and the arrival time of the transmission pulse is measured to detect the touch position.

In detail, an energy pulse is transmitted through an electrical path (e.g., a sensing line) having constant impedance. In this case, the sensing line has characteristic impedance. If the sensing line is terminated with the characteristic impedance, the reflected pulse and the transmission pulse are not generated. In other words, if the sensing line is terminated, it may be determined that there is no touch.

On the contrary, if the electrically conductive path is unterminated or the impedance variation occurs along the electrically conductive path, a portion of the pulse is reflected to the starting point from which the pulse is generated, and another portion of the pulse is transmitted in a traveling direction. In other words, if an impedance difference is made at any point of the sensing line, the reflected pulse and the transmission pulse may be generated and detected.

In general, when a wave travels, the wave may be deformed if the characteristic of a medium is changed or an obstacle exists in the middle of a traveling path of the wave. In this case, a portion of energy retained in the wave is returned, and another portion of the energy is transmitted in the traveling direction. According to the present invention, the arrival time of the transmission pulse is detected to detect the position where the transmission pulse resulting from the touch is generated.

For example, if capacitance is increased along the sensing line (for example, by a finger touch), a negative reflective pulse may be returned to the starting point of the sensing line, and a portion of the pulse may become the transmission pulse to travel to the end point of the sensing line. The arrival time of the transmission pulse at the end point is used to determine the distance to a point where an impedance difference is made.

Accordingly, impedance greater than that of the pulse passing through the sensing line 80 when there is no touch is formed at a touch point T by an input device. Accordingly, the transmission pulse transmitted through the touch point T has impedance different from that of the traveling pulse traveling without being transmitted at the touch point T. The transmission pulse is digital-converted, and analyzed in a time domain, so that data corresponding to a value lower or higher than a threshold value can be extracted. Thereafter, x and y (2D) coordinates serving as touch coordinates can be recognized based on an address corresponding to the extracted data of the transmission pulse. In other words, the transmission pulse is analyzed in the time domain based on the arrival time of the transmission pulse at the opposite end 80*b* of the sensing line 80 to recognize the length of the sensing line 80 to the touch point and the touch position of the sensing line 80.

The sensing line 80 may be formed as one line including the one end 80*a* to which a generated pulse is applied and the opposite end 80*b* at which the pulse transmitted along the sensing line 80 is terminated. In this case, the one end 80*a* of the sensing line 80 may be connected with a circuit unit.

The circuit unit drives the sensing line 80 so that the sensing operation can be performed. For example, the circuit unit may include a pulse generator 50 and a TDT measuring unit 60. The pulse generator 50 and the TDT measuring unit 60 are connected with one end 80*a* and an opposite end 80*b*.

The pulse generator 50 may be connected with one end 80*a* of the sensing line 80. The pulse generator 50 is a device to apply a plurality of pulses to the sensing line 80. In this case, the pulses may have an equal width, and may have different intervals there between.

The TDT measuring unit 60 may be connected with the opposite end 80*b* of the sensing line 80. The TDT measuring unit 60 receives a pulse applied to the one end 80*a* of the sensing line 80 through the pulse generator 50, travelling along the sensing line 80, and terminated at the opposite end 80*b* of the sensing line 80. The TDT measuring unit 60 can distinguish between the transmission pulse transmitted through the touch point and a traveling pulse traveling without being transmitted through the touch point. In detail, the TDT measuring unit 60 converts an analogue transmission pulse into digital data, extracts transmission pulse data corresponding to a value lower than or higher than the threshold from the digital-converted data, and recognizes touch coordinates based on those address corresponding to the transmission pulse data.

According to the TDT scheme, a touch gesture as well as a touch position can be recognized. In other words, a touch gesture such as drawing can be recognized. In addition, according to the TDT scheme, a repeated touch motion can be recognized. Accordingly, a differentiated user interface can be provided, and the experience of the user can be enlarged.

According to the TDT measuring scheme, the diameter of a touch tip can be reduced. For example, as compared with a conventional capacitive type touch scheme, the diameter of the touch tip can be reduced to a value in the range of 0.5 to 0.8. Accordingly, a touch can be delicately recognized. In addition, as compared with the conventional capacitive type touch scheme, the touch sensing speed can be improved. In other words, the touch sensing speed may be increased to several μs (microseconds).

According to the conventional capacitive type touch scheme, a wire is required to connect electrodes arranged in two mutually different directions with each other. In other words, Bezel is essentially required for an area for forming the wire, and a technical problem of reducing the Bezel has been discussed. According to touch sensing unit of the embodiment, the circuit part is formed at only one end and an opposite end of the sensing line, so that the Bezel can be reduced or omitted.

Hereinafter, a touch sensing unit according to still another embodiment will be described with reference to FIG. 15. FIG. 15 is a plan view showing the touch sensing unit according to still another embodiment. In the following description of the touch sensing unit according to still another embodiment, the details of the structure and the components the same as or similar to those of the above-described embodiment will be omitted.

Referring to FIG. 15, the touch sensing unit according to still another embodiment includes a substrate 10. The substrate includes an active area AA allowing a touch instruction input of a user. The sensing line 100 is formed on the active area AA. One sensing line 100 may be formed in one active area AA. In addition, although the drawings show only one active area AA and one sensing line 100, the substrate 10 may include a plurality of active areas AA and a plurality of sensing lines 100.

The sensing line 100 may be formed as one line including one end 100*a* to which a generated pulse is applied and the opposite end 100*b* at which the pulse transmitted along the sensing line 100 is terminated. In this case, the one end 100*a* of the sensing line 100 may be connected with a pulse generator 50 and a TDT measuring unit 60.

The pulse generator 50 is a device to apply a plurality of pulses to the sensing line 100. In addition, the TDT measuring 60 receives a pulse traveling along the sensing line 100 and transmitted.

The active area AA is divided into a plurality of unit cells UC. The unit cells UC may include the same pattern (hereinafter, a unit pattern). The unit cell may be formed in a circular shape or a polygonal shape. For example, the UC may be formed in a triangular shape or a rectangular shape. In this case, the unit cells UC may be repeated in at least two directions different from each other.

For example, when the unit cell UC has the rectangular shape, one unit cell UC makes contact with another unit cell UC in the first direction while making contact with still another unit cell UC in the second direction. Accordingly, the first direction may be perpendicular to the second direction.

In addition, for example, when the unit cell UC ha the triangular shape, the one unit cell UC may make contact with other unit cells UC provided in first to third directions. In this case the first to third directions form an angle of 120° with respect to each other.

The sensing line 100 is provided on the active area AA of the substrate 10. The sensing line 100 may be fully arranged on the entire surface of the active area AA. The sensing line 100 includes a first sensing pattern 101 and a second sensing pattern 102. The first sensing pattern 101 is a unit pattern formed in one unit cell UC, and the second sensing pattern 102 is a connection pattern to connect a unit pattern formed in one unit cell UC with a unit pattern formed in another unit cell UC In detail, in a plurality of unit cells UC provided in the active area AA, one unit pattern is formed in one unit cell UC. The first sensing pattern 101 refers to one unit pattern formed in the unit cell UC.

In addition, the second sensing pattern 102 is a pattern to connect the first sensing pattern 101 formed in one unit cell UC with the first sensing pattern 101 formed in another unit cell UC. In this case, the second sensing pattern 102 may be connected with one end and the opposite end of the first sensing pattern 101 formed in one unit cell UC. In this case, the first and second sensing patterns 101 and 102 may be integrally formed.

In this case, the second sensing pattern 102 may be connected with the first sensing pattern 101 of another unit cell UC provided in the first direction from the unit cell UC. In addition, the second sensing pattern 102 may be connected with the first sensing pattern 101 of another unit cell UC provided in the second direction from the unit cell UC. In other words, the second sensing pattern 102 connected with one end of the first sensing pattern 101 pattern 101 and the second sensing pattern 102 pattern 102 connected with the opposite end of the first sensing pattern 101 may extend in mutually different directions. In other words, the second sensing patterns 102 extending in the two directions mutually different from each other may be formed in one unit cell UC.

The first sensing pattern 101 may include a plurality of node points. The first sensing pattern 101 may include two node points. The first sensing pattern 101 may include patterns extending in mutually different directions based on the node points. For example, the first sensing pattern 101 may include U-shape patterns, and may include patterns extending in the first and second directions based on one node point.

In this case, the ratio of the length of the pattern extending in the first direction to the length of the pattern extending in the second direction based on one node point may be ranged from 1:5 to 5:1. Preferably, the ratio of the length of the pattern extending in the first direction to the length of the pattern extending in the second direction based on one node point may be ranged from 1:2 to 2:1. More preferably, the length of the pattern extending in the first direction may be substantially equal to the length of the pattern extending in the second direction based on one node point.

If a great difference is made between the length of the pattern extending in the first direction and the length of the pattern extending in the second direction based on one node point, as a pulse travels from the one end 100a to the opposite end 100b without the touch, the impedance of the sensing line 100 may be rapidly reduced. In this case, if the length of the sensing line 100 is increased, the data of the pulse arriving at the opposite end 100b cannot be extracted, and the transmission pulse and the touch may not be recognized.

The sensing line 100 may be fully formed on the entire surface as first sensing patterns 101 serving as the unit patterns are repeatedly arranged in at least two directions mutually different from each other. Accordingly, as compared with the case that the first sensing patterns 101 are repeatedly arranged only in one direction, the difference between the lengths of the patterns extending in the first and second directions from one node point can be more reduced. In addition, the impedance of the sensing line 100 can be prevented from being rapidly reduced, and the impedance noise can be reduced, so that the touch sensitivity can be improved.

In the sensing line 100, the difference between the length of the pattern extending in the first direction and the length of the pattern extending in the second direction in the unit pattern is reduced, so that the impedance difference between the one end 100a and the opposite end 100b of the sensing line 100 can be reduced. In addition, the impedance difference between one end 100a and the opposite end 100b of the sensing line 100 can be reduced, so that the sensing line 100 can be applied to a large-area touch sensing unit.

In detail, in the sensing line 100, the impedance difference between two points may be 40% or less of the impedance at one point. The distance between the two points may be 1 m. In other words, in the sensing line 100, the impedance difference per unit length of 1 m may be 40% or less.

Preferably, the impedance difference per unit length of the sensing line 100 may be 20% or less. More preferably, the impedance difference per unit length of the sensing line 100 may be 10% or less. As the impedance difference per unit length is reduced, the sensing line 100 can be applied to the large-area touch sensing unit. The impedance difference per unit length may be controlled by adjusting the difference between the lengths of the patterns extending in one direction and another direction from one node point of the sensing line 100.

FIGS. 16 to 19 are views showing input units of an electronic device according to various embodiments.

Hereinafter, the input unit of the electronic device according to various embodiments will be described with reference to FIGS. 16 to 19. In the following description, the details of the structure and the components the same as those of the electronic device according to the above-described embodiment will be omitted.

Referring to FIG. 16, the input unit may include a cover substrate 15 in which an input pattern may be formed. The input pattern of the input unit may be a letter pattern, or a function input pattern. The input pattern of the input unit may be a physical pattern that is visually recognized.

In this case, the input pattern may be printed on the cover substrate 15. In other words, the input pattern may be a pattern printed on the cover substrate 15, but the embodiment is not limited thereto. In other words, the input pattern may include various patterns sufficient to allow a user to visually recognize a proper position for a required input of the user.

As shown in FIG. 16, the electronic device including the input unit and the touch sensing unit is a keyboard. The input pattern is not limited to that shown in the drawing, but may include various shapes to form the keyboard.

In detail, the input unit may include an input pattern including Hangeul, English letter, number, special character, or function key patterns similarly to those of a typewriter. The electronic device cannot be individually used, but be grouped together with an image display device to determine, edit, or modify input contents.

A conventional keyboard has been operated through a scheme of measuring an amount of charges or current flow as a key is pressed, and a metallic spring, a rubber dome, and sponge are used to return the key to a state that the key is not pressed. Further, in the conventional keyboard, a fixed plastic frame is used to support a plurality of keys. Accordingly, the conventional keyboard may not be employed for the flexible electronic device, and may not be carried by a user.

The electronic device according to the embodiment may be formed with a thinner thickness than that of the conventional keyboard. In addition, the electronic device is curved or bended, so that an electronic device having a curved surface may be formed. In addition, the electronic device can be formed in the form of a transparent or a semitransparent keyboard. In other words, the curved electronic device can be easily carried by a user and can be variously designed.

Referring to FIG. 17, the input unit includes a cover substrate 25 having the input pattern. The input pattern of the input unit may be a mechanical pattern that can be visually recognized. The input pattern of the input unit may be a keyboard input pattern.

In this case, the input pattern may be printed on the cover substrate 25. In other words, the input pattern may be a pattern printed on the cover substrate 25, but the embodiment is not limited thereto. In other words, the input pattern may include various patterns sufficient to allow a user to visually recognize a proper position for a required input of the user. In this case, the electronic device including the input unit is a keyboard. The keyboard is a playing instrument, and refers to a board in which a plurality of keys are arranged in parallel. The input pattern may make sounds having various pitches according to user touches. The input pattern is not limited to that shown in the drawing, but the input pattern may have various shapes to form the keyboard.

Referring to FIG. 18, the input unit includes a cover substrate 35 having the input pattern. The input pattern of the input unit may be a letter pattern, or a function input pattern. The input pattern of the input unit may be a physical pattern that is visually recognized, and may be printed on the cover substrate 35. However, the embodiment is not limited thereto. In other words, the input pattern may include various patterns sufficient to allow a user to visually recognize a proper position for a required input of the user.

The electronic device including the input unit is a remote controller. The remote controller refers to an electronic device used for the operation of machine in a remote place. For example, the remote controller may be used to adjust a TV, a radio, an audio device. The input pattern is not limited to that shown in the drawing, but may have various shapes to form the remote controller.

Referring to FIG. 19, the input unit includes a cover substrate 45 having the input pattern. The input pattern of the input unit may be a letter pattern, or a function input pattern. In this case, the input pattern of the input unit may be a physical pattern that is visually recognized, and may be printed on the cover substrate 45. However, the embodiment is not limited thereto. In other words, the input pattern may include various patterns sufficient to allow a user to visually recognize a proper position for a required input of the user.

In this case, the electronic device included in the input unit may be included in a dashboard. In addition, the electronic device may be included in a center fascia of the dashboard. The dash board is a component mounted at the front of a driving seat or a passenger seat of a vehicle and equipped with various gauges for the driving of a vehicle. The center fascia refers to a control panel of the dash board between the driving seat and the passenger seat.

A controller of an audio device, an air conditioner, and a heater, and a navigation system may be installed at the center fascia. The input pattern may be a control pattern of an audio device, an air conditioner, and a heater, and a navigation system. However, the input pattern is not limited in the drawing, but may have various patterns applicable to the dash board.

FIGS. 20 to 22 are views examples that a display panel is assembled with the electronic device according to the embodiments.

The electronic device according to various embodiments may be assembled with the display panel.

In detail, the display panel may include a liquid display panel and a backlight unit serving as a surface light source for the liquid display panel. The display panel and the backlight unit may be integrally assembled with each other in a set cover. For example, the set cover may include a bottom cover, a support main cover, and an upper cover. In this case, the upper cover, the support main cover, and the bottom cover are integrally assembled with each other, and a cover film is bonded to the upper cover and the touch panel so that the touch panel may be integrally formed with the upper cover.

The liquid display panel may have a structure in which an upper substrate including RGB color filters and a lower substrate including a thin film transistor (TFT) and a pixel electrode are combined with each other while interposing a liquid crystal layer there between.

Further, the liquid display panel may have a color filter on transistor (COT) structure having a lower substrate including a color filter and a black matrix. A thin film transistor may be formed on the lower substrate, a protective layer may be formed on the thin film transistor, and a color filter layer may be formed on the protective layer. In addition, a pixel electrode making contact with the thin transistor film is formed on the lower substrate. In this case, in order to improve an opening rate, and simplify a mask process, the black matrix may be omitted, and a common electrode may perform the function of the black matrix together with the inherent function thereof.

The backlight unit may include a light emitting diode package (hereinafter, a light emitting package) including red (R), green (G), and blue (B) light emitting diodes (LED) or a white (W) LED, a printed circuit board having a plurality of power patterns to supply power to the light emitting package, a light guide plate to convert light supplied from the light emitting package in the form of surface light, a reflective plate provided on the rear surface of the light guide plate to improve light efficiency, and an optical sheet provided at the front (top surface) of the light guide plate for light concentration function and a light diffusion function.

The display panel may include an organic light emitting display panel. The organic light emitting display panel includes a self-emissive device that does not require an additional light source. The organic light emitting display panel includes a thin film transistor formed on a substrate and an organic light emitting device making contact with the thin film transistor. The organic light emitting device includes an anode, a cathode, and an organic light emitting layer interposed between the anode and the cathode. In addition, the organic light emitting display panel may further include an encapsulation substrate formed on the organic light emitting device to perform an encapsulation function.

The display panel is not limited thereto. In other words, the display panel may include an electrophoretic display (electric paper display (EPD)), a plasma display panel device (PDP), a field emission display device (FED), an electro luminescence display device (ELD), and an electro luminescence display device (EWD).

For example, referring to FIG. 20, the electronic device may be formed by combining the substrate 10 with a display panel 800. The substrate 10 and the display 800 may be bonded to each other through an adhesive layer 700. For example, the substrate 10 may be combined with the display panel 800 through the adhesive layer 700 including an optical clear adhesive (OCA) or an optical clear resin (OCR).

For example, referring to FIG. 21, the electronic device may be formed by combining the cover substrate 15 with the display panel 800. The cover substrate 15 and the display 800 may be bonded to each other through an adhesive layer 700. For example, the cover substrate 15 may be combined with the display panel 800 through the adhesive layer 700 including an optical clear adhesive (OCA) or an optical clear resin (OCR).

The sensing line 80 may be provided on the display panel 800. In other words, the display panel 800 may perform the function of the substrate 10.

In addition, a polarizing plate may be disposed under the cover substrate 15. The polarizing plate may be a linear polarizing plate or an anti-reflection polarizing plate. For example, when the display panel 800 is a liquid crystal display panel, the polarizing plate may be a linear polarizing plate. In addition, when the display panel 800 is an organic light emitting display panel, the polarizing plate may be an anti-reflection polarizing plate. In this case, at least one sensing line 80 may be provided on one surface of the polarizing plate. In other words, the polarizing plate may perform the function of the substrate 10.

According to the electronic device of the embodiment, at least one substrate to support the sensing line 80 may be omitted. Accordingly, a thin and light electronic device can be formed.

Then, referring to FIG. 22, the display panel includes a first panel substrate 810 and a second panel substrate 820. In this case, the sensing line 80 may be interposed between the first and second panel substrates 810 and 820. In other words, the sensing line 80 may be provided on at least one surface of the first panel substrate 810 or the second panel substrate 820.

In addition, a polarizing plate may be further provided under the cover substrate 15.

According to the electronic device of the embodiment, at least one substrate to support the sensing line 80 may be omitted. Accordingly, a thin and light electronic device may be formed. In addition, the sensing line 80 and a wire are formed together with a device formed in the display panel, thereby simplifying the fabricating process and reducing cost.

FIGS. 23 to 26 are views showing examples of a touch device employing the electronic device according to the embodiments.

Hereinafter, the touch device employing the electronic device according to the above-described embodiments will be described with reference to FIGS. 23 to 26.

Referring to FIG. 23, a mobile terminal is shown as one example of the touch device. The mobile terminal may include an active area AA and an unactive area UA. The active area AA may sense a touch signal through the touch by a finger, and an instruction icon pattern part and a logo may be formed in the unactive area UA Referring to FIG. 24, an electronic device may include a flexible electronic device that is bendable. Accordingly, the touch device including the electronic device may be a flexible touch device. Therefore, a user can curve or bend the flexible touch device with a hand. Such a flexible electronic device may be implemented for a wearable touch scheme.

Referring to FIG. 25, the electronic device may be applied to a vehicle navigation system as well as the touch device of a mobile terminal.

In addition, referring to FIG. 26, the electronic device may be applied to an inner part of a vehicle. In other words, the electronic device may be applied to various parts in the vehicle. Accordingly, the electronic device may be applied to a dashboard as well as a personal navigation display (PND), so that a center information display (CID) may be realized. However, the embodiment is not limited to the above, and the touch device may be used for various electronic appliances.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The electronic device according to the embodiment includes the touch sensing unit to perform a sensing operation through a time domain measuring scheme. The touch sensing unit can delicately recognize a touch and can have a rapid sensing processing speed, so that the touch can be accurately and rapidly recognized.

The invention claimed is:

1. An electronic device comprising:
a touch sensing unit; and
an input unit provided on the touch sensing unit, and comprising a cover substrate having an input pattern,
wherein the touch sensing unit comprises:
a substrate comprising an active area comprising a plurality of unit cells; and
a sensing line provided on the active area of the substrate to perform a sensing operation through a time domain measuring scheme,
wherein the active area comprises the unit cells extending in first and second directions different from each other,
wherein groups of four adjacent units cells are arranged on the substrate,
wherein in a first group of said groups of four adjacent unit cells, a first unit cell of the first group is connected to a third unit cell of the first group and a fourth unit cell of the first group, a second unit cell of the first group is connected to the fourth unit cell of the first group and a third unit cell of a second group of said groups of four adjacent unit cells, and the third unit cell of the first group is connected to a second unit cell of a third group of said groups of four adjacent unit cells,
wherein when two predetermined points are selected on the sensing line, the impedance at a point adjacent to the opposite end of the sensing line is less than the impedance at a point adjacent to the one end of the sensing line,
wherein the impedance difference between two points is 40% or less of the impedance at one point, and
wherein a distance of the sensing line between the two predetermined points is 1 meter or more.

2. The electronic device of claim 1, wherein the time domain measuring scheme is a scheme to output a reflected pulse, which is obtained by reflecting a pulse applied to one end of the sensing line from a touch point, from the one end of the sensing line.

3. The electronic device of claim 2, wherein the touch sensing unit further comprises a pulse generator and a TDR measuring unit connected with the one end of the sensing line.

4. The electronic device of claim 3,
wherein the pulse generator applies the pulse to the sensing line, and
wherein the TDR measuring unit converts the analogue-type reflected pulse into digital data, extracts the data of the reflected pulse corresponding to a value lower than or higher than the threshold from the digital data, and recognizes touch coordinates based on the address corresponding to the data.

5. The electronic device of claim 1, wherein the touch sensing unit further comprises:
- a pulse generator connected with the one end of the sensing line; and
- a time domain transmission (TDT) measuring unit connected with the opposite end of the sensing line.

6. The electronic device of claim 5,
wherein the pulse generator applies the pulse to the sensing line, and wherein the TDT measuring unit converts the analogue-type transmission pulse into digital data, extracts the data of the transmission pulse corresponding to a value lower than or higher than the threshold from the digital data, and recognizes touch coordinates based on the address corresponding to the data.

7. The electronic device of claim 1, wherein the input pattern of the input unit is a letter pattern, or a function input pattern, and the electronic device is a keyboard.

8. The electronic device of claim 1, wherein the input pattern of the input unit is a letter pattern or a function input pattern, and the electronic device is a remote controller.

9. The electronic device of claim 1, wherein the input pattern of the input unit is a letter pattern or a function input pattern, and the electronic device is a dashboard.

10. The electronic device of claim 1, wherein the input pattern of the input unit is a keyboard input pattern, and the electronic device is a keyboard.

* * * * *